(12) United States Patent
Kashitani et al.

(10) Patent No.: US 6,927,905 B1
(45) Date of Patent: Aug. 9, 2005

(54) ROTARY IMAGE VIEWING APPARATUS CONNECTED TO A ROTARY MIRROR CAMERA

(75) Inventors: Atsushi Kashitani, Tokyo (JP); Toshiyasu Nakao, Tokyo (JP)

(73) Assignee: NEC Corporation, Tokyo (JP)

( * ) Notice: Subject to any disclaimer, the term of this patent is extended or adjusted under 35 U.S.C. 154(b) by 923 days.

(21) Appl. No.: 09/702,671

(22) Filed: Nov. 1, 2000

(30) Foreign Application Priority Data

Nov. 2, 1999 (JP) ................................. 11-312354

(51) Int. Cl.$^7$ ..................... G02B 23/08; H04N 5/232; H04N 7/00
(52) U.S. Cl. .................. 359/402; 348/211.99; 348/36; 359/404
(58) Field of Search ....................... 348/211.1–211.99, 348/143, 195–206, 36–39; 359/402–405; 356/3.15–3.16; 345/121, 126, 905

(56) References Cited

U.S. PATENT DOCUMENTS 6,034,716 A * 3/2000 Whiting et al. ............... 348/36

FOREIGN PATENT DOCUMENTS

| JP | 9-292827 | 11/1997 |
| JP | 10-136237 | 5/1998 |

* cited by examiner

Primary Examiner—Wendy R. Garber
Assistant Examiner—Kelly L. Jerabek
(74) Attorney, Agent, or Firm—Foley & Lardner LLP

(57) ABSTRACT

A camera system has a rotary mirror type camera assembly including a camera, a mirror for camera arranged in front of the camera, and a mirror rotating mechanism driving the mirror for the camera, a rotary mirror type display apparatus including a monitor displaying an image picked up by the camera, a mirror for monitor arranged in front of the monitor, a finder permitting viewing of the image displayed on the monitor via the mirror for monitor, and a casing rotatable together with the mirror for monitor. The mirror for camera is rotated according to rotation of the casing and the mirror for monitor being fixed to the casing. When the casing is rotated, the mirror for monitor is rotated in display direction of the monitor in front of the monitor.

5 Claims, 35 Drawing Sheets

FIG. 24
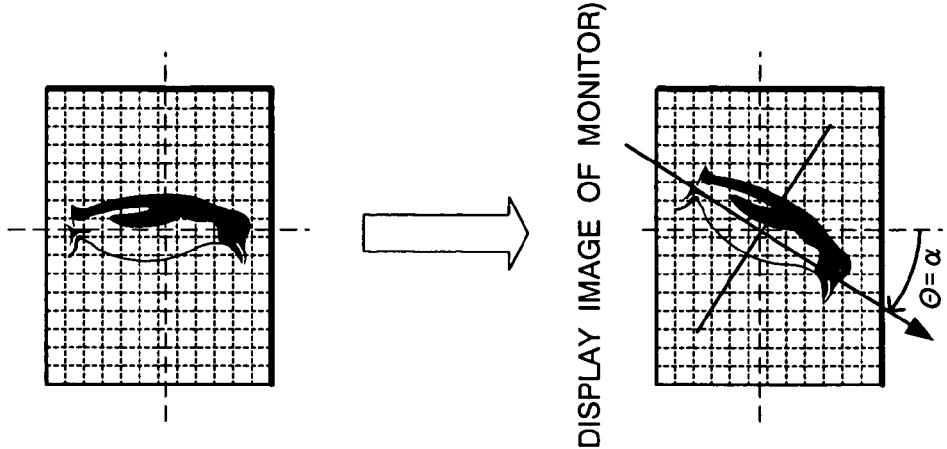
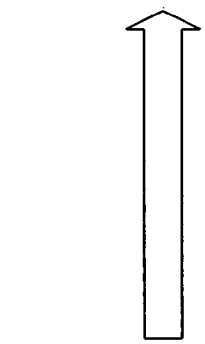
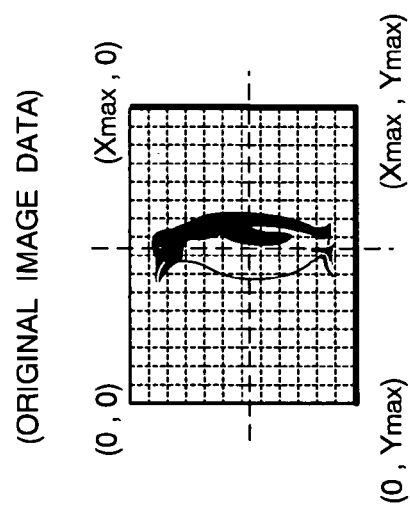

ROTARY IMAGE VIEWING APPARATUS CONNECTED TO A ROTARY MIRROR CAMERA

BACKGROUND OF THE INVENTION

1. Field of the Invention

The present invention relates to a camera system using a rotary mirror type display apparatus which displays an image via a rotary mirror arranged in front of a monitor, and a display apparatus.

2. Description of the Related Art

The present invention concerns a camera system and a display apparatus, in which a rotary camera type display apparatus displaying an image through a rotary mirror arranged in front of a monitor capable of displaying an image from a camera and a rotary mirror type camera picking-up an image of an object via a rotary mirror arranged in front of the camera. In the following disclosure, as discussion for the prior art, to which the present invention is related, examples of two optical and electronic periscopes, one rotary mirror type camera, and one periscope type display apparatus will be discussed.

[Optical Periscope]

An optical periscope is a periscope operated optically without using an electronic equipment, such as a camera and a monitor and has a construction as illustrated in FIG. 27. A user may see an object in a finder through two mirrors fixed to a casing. Also, a direction to see is variable by rotating the casing. As illustrated in FIG. 27, electronic equipments which require wiring for power supply and signal transmission, are not contained in the casing and is constructed with optical parts. Therefore, the casing can be rotated over 360° endless manner and can vary the direction to view over 360°. Therefore, as mounted in submarine, condition on the water can be viewed from under the sea. In the alternative, it may be used to observe an opposite side sight over a high fence. Furthermore, since an absolute direction of the user looking into the periscope always matches with an absolute direction viewed across the periscope to permit observation over 360° in visceral manner.

[Electronic Periscope]

An electronic periscope is constructed with a combination of a camera rigidly secured on a universal head and a periscope type display Apparatus rotating the monitor per se which displays an image from the camera. The construction of the electronic periscope is illustrated in FIG. 28.

In the shown prior art, the electronic periscope is constructed with a combination of a rotary universal head type camera 400 and a periscope type display apparatus 300. The rotary universal head type camera 400 is constructed with a camera 401, a motor 203 driving the camera 401 to rotate via a gear 402 on the basis of a control signal of a control circuit 208, an encoder 204 and an origin sensor for detecting an angular position and an origin position about vertical line with respect to a floor or a ground surface where the camera is placed, and the control circuit 208 for controlling revolution of the motor 203. The periscope type display apparatus is constructed with a gear 302 rigidly secured on a casing 110, a support 107 fixed to the gear 302, a monitor supported by the support 107 and displaying an image signal transmitted from the camera 401, a finder 108 provided on the casing for permitting the user to observe the monitor 301, a gear for transmitting rotation of the gear 302 to an encoder 104, the encoder 104 and an origin sensor 105 for detecting the angular position about the vertical line with respect to the floor or the ground surface, on which the user stands, a handle 109 to be gripped by the user upon rotating the casing.

Next, operation of the foregoing prior art will be discussed. When the user rotates the casing 110 with observing the monitor 301 as looking into the finder 108, the encoder 104 and the origin sensor 105 detects the angular position of the casing via the gear 302 to feed an angle signal A and an origin signal A indicative of detection of the origin, to the control circuit 208. The control circuit 208 drives the camera 401 to rotate on the basis of the angle signal A and the origin signal A and an angle signal B indicative of angular position of the camera 401 and an origin signal B. Revolution of the motor 203 is transmitted to the camera 401 via the gear 402 to drive the camera 401 to rotate. As a method to establish correspondence between the angular position of the casing 110 and the angular position of the camera 401, for example, there is a method to match an orientation (north, south, east and west) of the user looking into the finder 108 and an orientation of the camera 401, namely to establish correspondence so that the absolute orientations become the same. The image data picked-up by the camera 401 is fed to the monitor 301 as an image signal and thus displayed.

As set forth above, the user may orient the camera 401 to the desired direction to monitor by rotating the casing 101. At the same time, the image from the camera can be seen on the monitor 301 across the finder 108. Namely, it becomes possible to monitor all direction over 360° from the site where the rotary universal head type camera 400 on the site where the periscope type display apparatus 300 is installed. Furthermore, similarly to the optical periscope, by matching the absolute angles of the orientation of the user and the orientation of the camera or by matching relative angular displacement, identification of orientation and change of direction can be done visceral manner.

[Camera Control System as Combination of Rotary Mirror Type Camera and Normal Monitor]

A construction of a camera control system, in which a rotary mirror type camera and a normal monitor, is illustrated in FIG. 29.

The conventional camera control system illustrated in FIG. 29 is constructed with a rotary mirror type camera 200, image conversion means 502 for image conversion of an image from the camera 201, a monitor 501 for displaying the image processed for conversion by the image conversion means 502 and a rotary mirror operating means 503 for feeding an operation signal of operation of the user to the control circuit 208. The camera 201 is constructed with the camera 201, a mirror 202 arranged in front of the camera 201 at an angle about 45° with respect to a light axis, a motor 203 driving the mirror 202 for rotation about the light axis of the camera 201, the encoder 204 and the origin sensor 205 detecting the angular position of the mirror 202 about the light axis of the camera and the origin position, and the control circuit 208 for controlling revolution of the motor 203.

Operation of the prior art shown in FIG. 29 will be discussed. When the user operates the rotary mirror operating means 503, the operation signal indicative of the content of control is fed to the control circuit 208. As the rotary mirror operating means 503, lever, dial, cursor key and so forth are applicable, for example. When the cursor key 208 is applied, it may be required to rotate the mirror toward right and left by a right arrow key and left arrow key. The control circuit 208 controls the motor 203 on the basis of the operation signal from the rotary mirror operating means 503, the angle signal B from the encoder, the origin signal B from the origin sensor 205 to realize rotation of mirror depending upon operation by the user. The image thus input to the camera 201 via the mirror 202 driven to rotate, is fed to the image conversion means 502 as the image signal.

The process of image conversion in the image conversion means 502 will be discussed with reference to FIG. 30. The camera 201 does not vary relative angle with respect to the floor or the ground surface, on which the rotary mirror type camera 200 is fixed, and only mirror 202 is relatively rotated. Therefore, the image input to the camera 201 via the mirror 202 which is rotated, is rotated in vertical direction of the object (upper half of FIG. 30: arrow represents up and down direction of the object, and the arrow points upward direction). Namely, the vertical direction of the object is rotated in the image associating with rotation of the mirror 202.

The image conversion means 502 converts the rotation converts the image to place upward direction of the object to upward direction of the arrow as the converted image which is illustrated. However, in this manner, the user may see rotated rectangular image.

On the other hand, when the mirror 202 is placed at various angle, and if the converted images are overlaid in coaxial fashion, there are circle C2 constantly enclosing the overall screen, a circle C1 constantly presenting the image, a rectangle S1 touching internally with the circle C1 and a rectangle S2 touching externally to the circle C2 (lower half of FIG. 30). Accordingly, for example, by clipping a region corresponding to the circle C1 in the converted image and displaying on the monitor 501, the user may constantly see the image of the same shape (circle in this case).

In the prior art as set forth above, the user may monitor the image of the desired direction on the monitor 501 by rotating the mirror 202 by operating the rotary mirror operating means 503.

[Japanese Unexamined Patent Publication No. Heisei 9-292827 "Rotary Type Image Viewing Apparatus"]

As the prior art relating to the periscope type display apparatus, there is a "rotary type image viewing apparatus" disclosed in Japanese Unexamined Patent Publication No. Heisei 9-292827.

FIG. 31 is an illustration showing a construction of the conventional rotary type image viewing apparatus. For facilitating understanding correspondence with the embodiments of the present invention, respective components illustrated in Japanese Unexamined Patent Publication No. Heisei 9-292827 will be identified by names and reference numerals different from those used in the publication. However, the following discussion for the above-identified publication will not change significance of the disclosure.

In the shown prior art, the rotary type image viewing apparatus is constructed with the periscope type display apparatus 300, image storage means 601 for storing the overall image for displaying on the monitor 301 and image extracting means 602 for detecting angular position of the casing on the basis of the signals from the encoder 104 and the origin sensor 105 and extracting the image to be displayed from the overall image stored in the image storage means 601 depending upon the angular position for displaying on the monitor. The periscope type display apparatus is constructed with the gear 302 fixed to the casing 110, the monitor 301 supported by the support 107, the finder 108 provided in the casing 110 so that the user may view the monitor 301, the gear 302 for transmitting rotation of the gear 302 to the encoder 104, the encoder 104 and the origin sensor 105 for detecting the angular position about the vertical line with respect to the floor or the ground surface where the user stands and the origin position, the handle 109 to be gripped by the user when the casing 110 is rotated.

Operation of the prior art will be discussed. When the user rotates the casing with gripping the handle 109 with looking into the monitor 301 through the finder 108, the encoder 104 and the origin sensor 105 detects the angular position of the casing 110 via the gear 302 to feed the angle signal A and the origin signal A indicative of detection of the origin to the image extracting means 602. The image extracting means 602 extracts the image to be displayed on the monitor 301 in the overall image stored in the image storage means 601. The image extracted by the image extracting means 602 is fed to the monitor 301 for displaying.

FIG. 32 is an illustration showing a manner of extraction of the image to be displayed on the monitor 301 by the image extracting means 602 from the overall image stored in the image storage means 601. When an image as viewed from inside of a Penguin breeding space in an aquarium virtually, Panoramic image as shown (upper half in FIG. 32) may be stored in the image storage means 601. Lateral direction of the Panoramic image corresponds to the direction which the user desire to view, namely the angular position of the casing 110, by the shown prior art of the rotary type image viewing apparatus. The direction to be viewed extends over all directions from 0° to 360°. If the user rotates the casing 110 over an angle α from a reference position, the image extracting means extracts the image of the portion corresponding to the angle α from the overall Panoramic image (lower half of FIG. 32) to feed to the monitor 310.

[Rotary Type Image Viewing Apparatus Discussed as Prior Art in Japanese Unexamined Patent Publication No. Heisei 9-292827]

As the prior art relating to the rotary type image viewing apparatus, discussion will also be given for the rotary type image viewing apparatus (corresponding to FIGS. 3 and 4 of Japanese Unexamined Patent Publication No. Heisei 9-292827) which has been disclosed as prior art in the above-identified publication, and which is shown in FIG. 33. Again, names and reference numerals different from those used in the publication are used for facilitating understanding of correspondence with the embodiments of the present invention. However, the following discussion for the above-identified publication will not change significance of the disclosure.

The shown prior art is constructed with a periscope type display apparatus 700 and an image generating means 600A. The periscope type display apparatus 700 includes a ring gear 106 fixed to the casing 110, the support 107, a monitor 701 supported by the support 107, the mirror 102 supported on the support 107 at an angle approximately 45° with respect to a straight line extending frontwardly through substantially center of the monitor 101 perpendicular to the display screen 101, a finder 108 for looking into the image on the monitor via the mirror 102, the encoder 104 and origin sensor 105 for detecting the angular position about the vertical line with respect to the floor or the ground surface where the user stands and the origin position, the handle 109 to be gripped by the user when the casing 110 is rotated. The image generating means includes an image storage means 601 storing overall image for displaying on the monitor 701, image extracting means 602 for detecting angular position of the casing on the basis of the signals from the encoder 104 and the origin sensor 105 and extracting the image to be displayed from the overall image stored in the image storage means 601 depending upon the angular position for displaying on the monitor and image conversion means 603A for performing conversion so that the image may be correctly displayed with respect to left and right and up and down on the periscope type display apparatus.

Operation of the shown prior art will be discussed.

The user rotates the casing 110 with gripping the handle 109 with observing the image on the monitor 301 reflected by the mirror 102 as looking into the finder 108. Then, the encoder 104 and the origin sensor 105 detects angular position of the casing 110 via the gear 302 to feed the angle signal A and the origin signal A indicative of the origin detection to the image extracting means 602. The image extracting means 602 extracts the image to be displayed on the monitor 701 from the overall image stored in the image storage means 601 on the basis of the angle signal A and the origin signal A to feed to the image conversion means 603A. The image conversion means 603A converts the image fed from the image extracting means 602 by inverting in up side down manner with taking a horizontal line extending through the center of the image as symmetry axis to feed to the monitor 701. The image displayed on the monitor 701 is provided to the user from the finder 108 via the mirror 102. In the image conversion means 603A, a reason for inverting the image in up side down manner is that the display image on the monitor 701 is inverted up side down as output to the finder 108 as reflected by the mirror 102, as shown in FIG. 34.

FIG. 35 is an illustration showing a manner of image conversion process, in which the image to be displayed on the monitor is extracted by the image extracting means 602 from the overall image stored in the image storage means 601 and is processed for image conversion by the image conversion means 603A. Up to image extraction, the process is the same as those discussed with reference to FIG. 32 (upper and intermediate portions of FIG. 35). In the shown prior art, the extracted image is inverted in up-side-down manner by the image converting means 6093A.

However, the foregoing four prior arts encounter the following drawbacks.

[Problem of Optical Periscope]

Since the reflection light from the object is optically led to the finder, it is the most feasible way to extend an optical path directly above the site where the user is located to see the object from the higher position than the user. A typical example of this is the periscope employed in the submarine. Accordingly, for observing the object from the position distanced in horizontal direction instead of directly above the user, a complicated optical system is required and is significantly difficult or even impossible to realize in certain case.

[Problem of Electronic Periscope]

By employing the electronic periscope, the image of the distal site which has been difficult to monitor by the optical periscope can be monitored. Namely, by installing a rotary universal head type camera at the distal site, the camera is driven to control the angular position by the periscope type display apparatus for monitoring the obtained image. However, in case of the rotatable universal head type camera, whole camera or the entire monitor in case of the periscope type display apparatus are rotated. The camera and monitor are relatively bulky and heavy. Accordingly, both of the rotatable universal head type camera and the periscope type display apparatus may have bulky and heavy rotary portions. This results is increasing of size of motor and requiring large current in the rotary universal head type camera on one hand and increasing size and weight of the casing to be operated by the user to rotate in the periscope type display apparatus on the other hand.

Furthermore, for the monitor and the camera, electrical connection is inherent. When the periscope type display apparatus is desired to be rotated in endless manner, connection between the rotating portion and the rotated portion has to be connected through a slip ring.

[Problem in Camera Control System Combined with Rotary Mirror Type Camera and Normal Monitor]

The rotary mirror type camera has no electrical connection and can obtain wide vision image by rotating only relative light weight mirror to contribute for downsizing of the apparatus. However, since the camera is fixed and only mirror is rotated, the obtained image is rotated in vertical direction. Accordingly, upon displaying the image on the normal monitor, it is required to display the obtained image after rotational conversion process.

[Problem of "Rotary Image Viewing Apparatus" as Disclosed in Japanese Unexamined Patent Publication No. Heisei 9-292827]

Even in this prior art discussion with reference to FIGS. 31 and 33, there is an electrical connection and has a relatively heavy monitor which is rigidly secured on the periscope type casing operated by the user. Therefore, the user has to rotate the heavy casing. Furthermore, for rotating the casing in an endless manner, a slip ring has to be employed inherently.

SUMMARY OF THE INVENTION

The present invention has been worked out in view of the problems in the prior art set forth above. It is therefore an object of the present invention to provide a camera system and the display apparatus which can permit the camera to be installed at distal site which has been difficult in the optical periscope.

Another object of the present invention is to provide the camera system and the display apparatus which permits to make the rotary portion compact and light weight, and thus contributes down sizing the reduction of weight of the whole apparatus.

A further object of the present invention is to provide the camera system and the display apparatus which can eliminates necessary of providing an electrical connection between the rotating portion and the rotated object.

A still further object of the present invention is to provide a camera system and a display apparatus which can view the image on a rotary mirror type display apparatus while the rotary mirror type camera so that the picked up image may be seen by the rotary mirror type display apparatus in spite of the fact that the picked up image may reverse head and tail depending upon angular position of the rotary mirror type camera to eliminate necessity of image conversion process.

According to the first aspect of the invention, a camera system, in which user operates a camera to watch an image obtained by the camera, comprises a rotary mirror type camera assembly including a camera,
a mirror for camera arranged in front of the camera with a given angle relative to a light axis of the camera, and
a mirror rotating mechanism driving the mirror for the camera to rotate about the light axis of the camera, a rotary mirror type display apparatus including a monitor displaying an image picked up by the camera, a mirror for monitor arranged in front of the monitor with a given angle with respect to a display direction of the monitor, a finder permitting viewing of the image displayed on the monitor via the mirror for monitor, and a casing rotatable together with the mirror for monitor about an axis extending through substantially a center of the display screen of the monitor perpendicular to the display screen, the mirror for camera being rotated according to rotation of the casing, the mirror for monitor being fixed to the casing, when the casing is rotated, the mirror for monitor being rotated in display direction of the monitor in front of the monitor.

In the preferred construction, the rotary mirror type camera assembly and the rotary mirror type display apparatus are arranged so that an angle between an image pick-up direction along a light axis of the camera and the display direction of the monitor is within a range greater than or equal to 90° and smaller than or equal to 270°.

In another preferred construction, a circular window having an opening portion is arranged between the monitor and the mirror for monitor, among an image displayed on the monitor, the image in a region corresponding to the opening portion is provided to a user as an image through the mirror for monitor and the finder.

In another preferred construction, the rotary mirror type camera assembly and the rotary mirror type display apparatus are arranged so that an angle between an image pick-up direction along a light axis of the camera and the display direction of the monitor is within a range greater than or equal to 90° and smaller than or equal to 270°, a circular window having a circular opening portion between the monitor and the mirror for monitor, among an image displayed on the monitor, the image in a region corresponding to the opening portion is provided to a user as an image through the mirror for monitor and the finder.

In another preferred construction, a rectangular window having a rectangular opening is arranged between the monitor and the mirror for monitor, the rectangular window is fixed to the casing, among an image displayed on the monitor, the image in a region corresponding to the opening portion is provided to a user as an image through the mirror for monitor and the finder.

In another preferred construction, the rotary mirror type camera assembly and the rotary mirror type display apparatus are arranged so that an angle between an image pick-up direction along a light axis of the camera and the display direction of the monitor is within a range greater than or equal to 90° and smaller than or equal to 270°, a rectangular window having a rectangular opening portion between the monitor and the mirror for monitor, the rectangular window is fixed to the casing, among an image displayed on the monitor, the image in a region corresponding to the opening portion is provided to a user as an image through the mirror for monitor and the finder.

In another preferred construction, one of a circular window and a rectangular window is arranged between the monitor and the mirror for monitor, the one of circular window and rectangular window is fixed to the casing, among an image displayed on the monitor, the image in a region corresponding to the opening portion is provided to a user as an image through the mirror for monitor and the finder.

In another preferred construction, the rotary mirror type camera assembly and the rotary mirror type display apparatus are arranged so that an angle between an image pick-up direction along a light axis of the camera and the display direction of the monitor is within a range greater than or equal to 90° and smaller than or equal to 270°, one of a circular window and a rectangular window is arranged between the monitor and the mirror for monitor, the circular window or rectangular window is fixed to the casing, among an image displayed on the monitor, the image in a region corresponding to the opening portion is provided to a user as an image through the mirror for monitor and the finder.

In another preferred construction, the rotary mirror type camera assembly and the rotary mirror type display apparatus are arranged so that an angle between an image pick-up direction along a light axis of the camera and the display direction of the monitor is within a range smaller than or equal to 90°, the camera system further comprises image converting means for converting the camera so that the image of the object can be correctly displayed with respect left and right and up and down on the rotary mirror type display apparatus.

According to the second aspect of the invention, a camera system, in which user operates a camera to watch an image obtained by the camera, comprises a rotary universal head camera including a camera and a universal head which can rotate the camera at least in horizontal direction, a rotary mirror type display apparatus including a monitor displaying an image picked up by the camera, a mirror for monitor arranged in front of the monitor with a given angle with respect to a display direction of the monitor, a finder permitting viewing of the image displayed on the monitor via the mirror for monitor, and a casing rotatable together with the mirror for monitor about an axis extending through substantially a center of the display screen of the monitor perpendicular to the display screen, the universal head being rotated according to rotation of the casing, image converting means for converting the camera so that the image of the object can be correctly displayed with respect left and right and up and down on the rotary mirror type display apparatus.

In the preferred construction, a circular window having an opening portion is arranged between the monitor and the mirror for monitor, among an image displayed on the monitor, the image in a region corresponding to the opening portion is provided to a user as an image through the mirror for monitor and the finder.

In another preferred construction, one of a circular window and a rectangular window is arranged between the finder and the mirror for monitor, the circular window or the rectangular window is fixed to the casing, among an image displayed on the monitor, the image in a region corresponding to the opening portion is provided to a user as an image through the mirror for monitor and the finder.

According to another aspect of the invention, a display apparatus comprises
  a rotary mirror type display apparatus including a monitor displaying an image, a mirror for monitor arranged in front of the monitor with a given angle with respect to a display direction of the monitor, and a finder permitting viewing of the image displayed on the monitor via the mirror for monitor, and a casing rotatable together with the mirror for monitor about an axis extending through substantially a center of the display screen of the monitor perpendicular to the display screen, and
  image generating means including image storage means for storing overall image to be displayed on the monitor, image extracting means for extracting image to be displayed on the monitor from the overall image according to rotation of the casing, and image converting means for converting the image extracted by the image extracting means, for correct display of an object on the rotary mirror type display apparatus correctly with respect to left and right and up and down directions,
  the image generated by the image generating means being displayed on the monitor and overall image stored in the image storage means can be seen by rotating the casing.

In the preferred construction, a circular window having an opening portion is arranged between the monitor and the mirror for monitor,
  among an image displayed on the monitor, the image in a region corresponding to the opening portion is provided to a user as an image through the mirror for monitor and the finder.

In another preferred construction, a rectangular window having a rectangular opening is arranged between the monitor and the mirror for monitor,
  the rectangular window is fixed to the casing,
  among an image displayed on the monitor, the image in a region corresponding to the opening portion is provided to a user as an image through the mirror for monitor and the finder.

In another preferred construction, one of a circular window and a rectangular window is arranged between the finder and the mirror for monitor,
  the circular window or the rectangular window is fixed to the casing,
  among an image displayed on the monitor, the image in a region corresponding to the opening portion is provided to a user as an image through the mirror for monitor and the finder.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 24 is an illustration showing a manner of image conversion process in the image conversion means when θ=α;

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

First Embodiment

[External Appearance]

Figure 1:
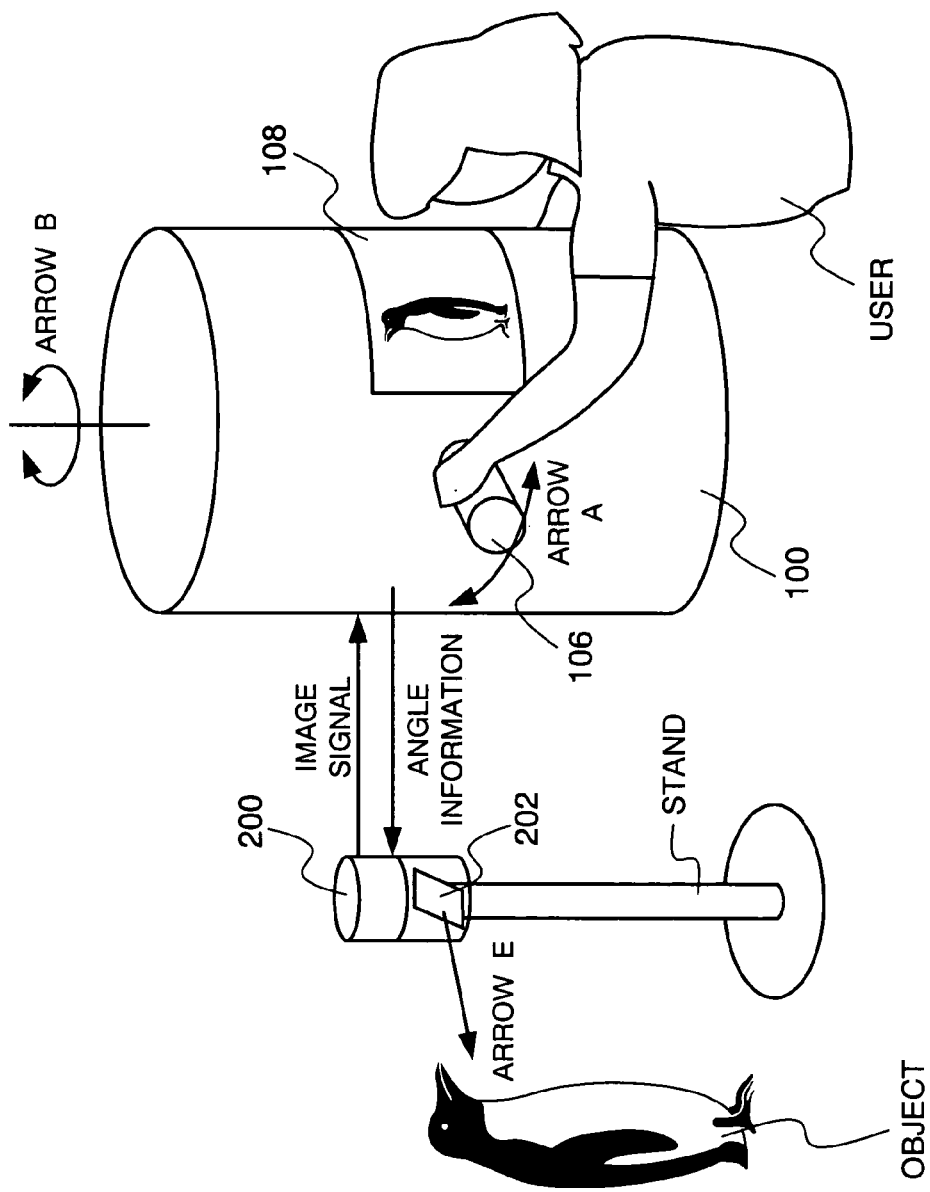
FIG. 1 is an illustration showing an external view of the first embodiment of a camera system according to the present invention.

FIG. 1 is an illustration showing an external view of the first embodiment of a camera system according to the present invention.

Referring to FIG. 1, the first embodiment of a camera system according to the present invention is constructed with a rotary mirror type display apparatus 100 and a rotary mirror type camera 200.

A user grips a handle 106 with observing an image picked-up by the rotary mirror type camera 200 looking into a finder 108. The user rotates the rotary mirror type display apparatus 100 as shown by arrow B. Then user may observe or view the surrounding of the rotary mirror type camera 200.

If a cable between the rotary mirror type display apparatus 100 and the rotary mirror type camera 200 for transferring an image signal and an angle signal is made long or by using radio signal, a condition around the rotary mirror type camera 200 located at remote site can be observed or viewed by the rotary mirror type display apparatus 100. It should be noted that, in the drawings, there is shown a case where the object is a penguin. This permits establishment of a system enabling visitors visiting an aquarium to experience as-if being a fellow penguin by operating the rotary mirror type display apparatus 100, by installing the rotary mirror type camera 200 in a penguin breeding space of the aquarium, for example. By setting the height of the rotary mirror type camera 200 approximately equal to the height of the penguin, realistic feeling may be enhanced.

[Construction]

Figure 2:
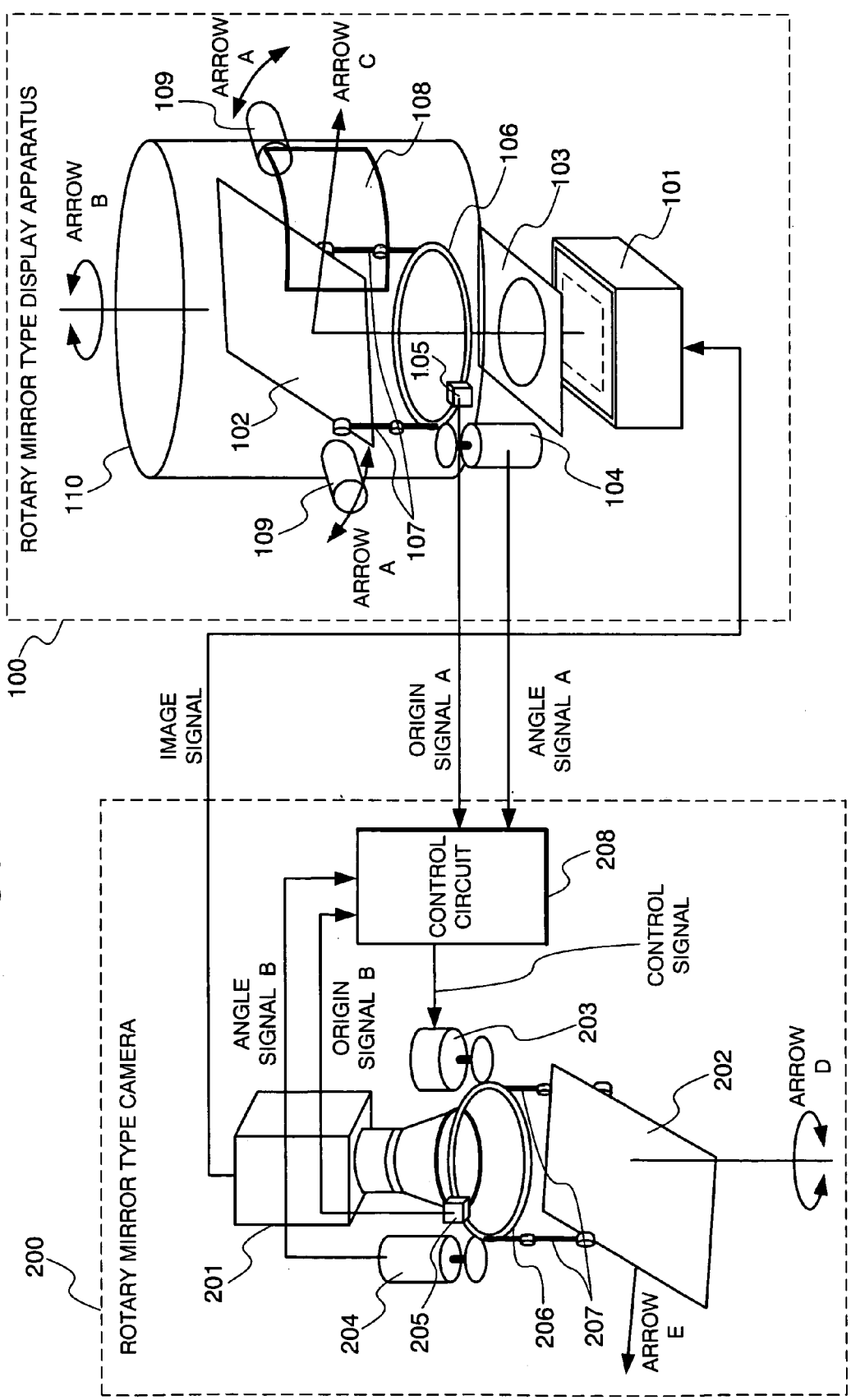
FIG. 2 is a constructional illustration of the first embodiment of the camera system according to the present invention.

FIG. 2 is an illustration showing a construction of the first embodiment of the camera system according to the present invention.

Referring to FIG. 2, the first embodiment of the camera system according to the present invention is constructed with the rotary mirror type display apparatus 100 and rotary mirror type camera 200. The rotary mirror type camera 200 is constructed with a camera 201, a ring gear 206 arranged coaxially arranging the center axis thereof with a light axis of the camera 201, a support 207 rigidly fixed to the ring gear 206, a mirror 202 supported by the support 207 an angle about 45° with respect to the light axis of the camera in front of the camera 201, a motor 203 rotatingly driving the mirror 202 via the ring gear 206 about the light axis of the camera 201, an encoder 204 and an origin sensor 205 for detecting an angular position of the ring gears 206 about the light axis and the origin position with respect to the camera 201 and a control circuit 208 for controlling revolution of the motor 203. The rotary mirror type display apparatus 100 is constructed with a generally cylindrical periscope type casing 110, a monitor 101, a circular window 103 located with aligning a center axis of an opening portion with a straight line extending through substantially the center of the monitor 101 and perpendicular to the display screen, a ring gear located with placing a center axis thereof coaxial with the straight line extending through substantially the center of the monitor 101 and rigidly fixed to the casing 110, the support 107 fixed to the ring gear 106, a mirror 102 supported by the support 107 with an angle substantially 45° with respect to the straight line extending frontwardly through substantially center of the monitor 101 perpendicular to the display screen and reflecting the display image of the monitor 101 in a direction of arrow C, an encoder and an origin sensor 105 detecting angular position and origin position of the ring gear 106, a finder 108 provided in the casing 110 for viewing the screen of the monitor 101 via the mirror 102, and a handle 109 provided on the casing 110 so that the user may grip to rotate the casing 110.

[Operation]

Operation of the shown embodiment will be discussed.

With looking into the screen of the monitor 101 reflected by the mirror 102 through the finder 108, the user grips the handle 109 to operate in the direction of arrow A to rotate the casing 110 in a direction of arrow B. Since the ring gear 106 is fixed to the casing 110, the ring gear 106 is rotated associating with rotation of the casing 110 to drive the support 107 fixed to the ring gear 106 and the mirror 102 supported by the support 107 to rotate simultaneously. However, the monitor 101 is separated from the casing 110, and thus is held stationary. Namely, with respect to the floor or ground surface, on which the user and rotary mirror type display apparatus 10 are present, the monitor 101 is stable, and the casing and the ring gear 106, the support 107 and mirror 102 fixed to the casing are rotated. Of course, the user rotates the casing with moving to the position where the finder 108 can be looked into.

When the casing 110 is rotated, the encoder 104 and the original sensor 105 feeds the angle signal A indicative of the angular position of the casing 110 and the origin signal A indicative of detection of origin to the control circuit 208. The control circuit 208 drives the mirror 202 to rotate in a direction of arrow D depending upon the angle signal A and the origin signal A and the angle signal B indicative of the angular position of the mirror and the origin signal B indicative of detection of the origin. To the camera 201, the object in the direction of arrow E is picked up via the mirror 202. Then the image data thus picked up is fed to the monitor 101 as the video data.

As a method for establishing correspondence between the angular position of the casing 110 and the angular position of the mirror 202, there is a method to match an absolute azimuth (north, south, east and west) and the absolute azimuth. On the other hand, there is a method to constantly match the relative angular variation, namely, when the casing is turned 90° toward right, the mirror 202 also turns 90° toward right. In either case, for the user, the direction in observation and viewing can be recognized viscerally.

[Definition of Angular Position of Image Pick-up Element 209 and Mirror 202]

Figure 3:
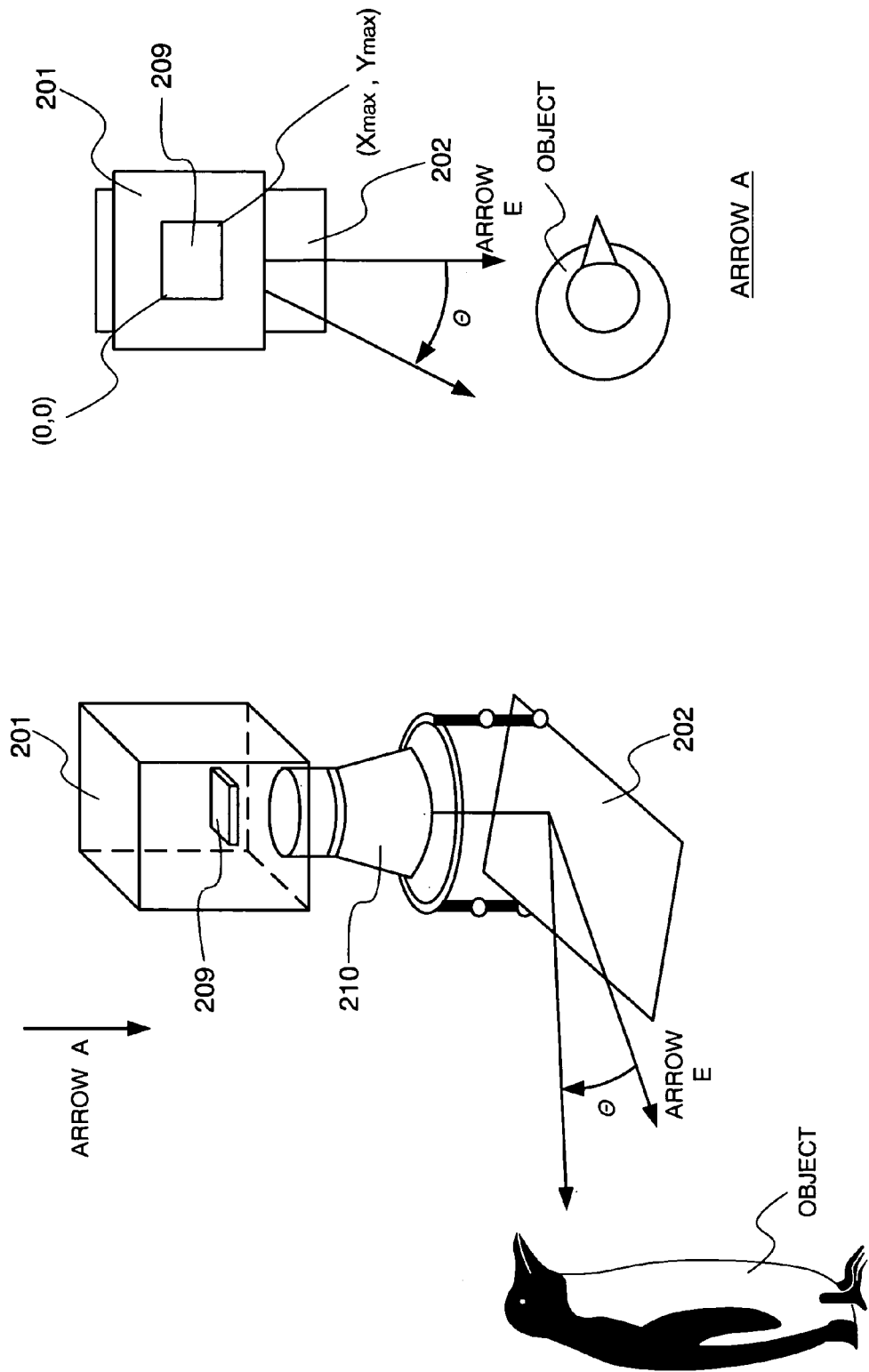
FIG. 3 is an illustration showing a relationship between an image pick-up element built-in the first embodiment of the camera system and an object and an angular position of a mirror.

In the camera 201, an image pick-up element 209 is built-in for converting an external light inciding through a lens into an electrical signal. FIG. 3 is an illustration showing a construction of an angular position of the camera 201, an image pick-up element 209, a lens 210 and the mirror 202, and, an angular position of the mirror 202. The drawing on right side, is an illustrated as viewed along an arrow A. The image pick-up element 209 is consisted of photosensitive element arranged two-dimensionally. An image data consisted of an electrical signal depending upon intensity of the incident light to each photosensitive element is output. Each image of the output image data corresponds to the photosensitive element forming the image pick-up element 209.

Each photosensitive element and each pixel in the image corresponding thereto can be expressed by (X, Y) coordinate system. Here, in the direction of arrow A, namely as viewed from the back surface of the camera, left upper position is assumed as (0, 0), (1, 0), (2, 0), . . . ($X_{max}$, 0), and the photosensitive elements located in the lowermost row are assigned as (0, 1, (1, 1), . . . ($X_{max}$, 1), and the pixel located at the most right lower position is assigned as ($X_{max}$, $Y_{max}$). The reason why such coordinate system is employed is to facilitate understanding of correspondence for correctly displaying up and down and right and left of the image by displaying the light intensity received at the photosensitive element (0, 0) at the most left upper pixel (0, 0) of the monitor and displaying the light intensity received at the photosensitive element ($X_{max}$, $Y_{max}$) at the most right lower pixel ($X_{max}$, $Y_{max}$) of the monitor.

Concerning angular position of the mirror 202, in the (X, Y) coordinate system expressing each photosensitive element of the image pick-up element 209 as shown in FIG. 3, a condition oriented perpendicular to X direction and to positive direction is assumed as θ=0°, and clockwise direction as viewed along the arrow A is assumed as positive direction of θ.

[Relationship between Picked-up Image and Display Image on Monitor]

Figure 4:
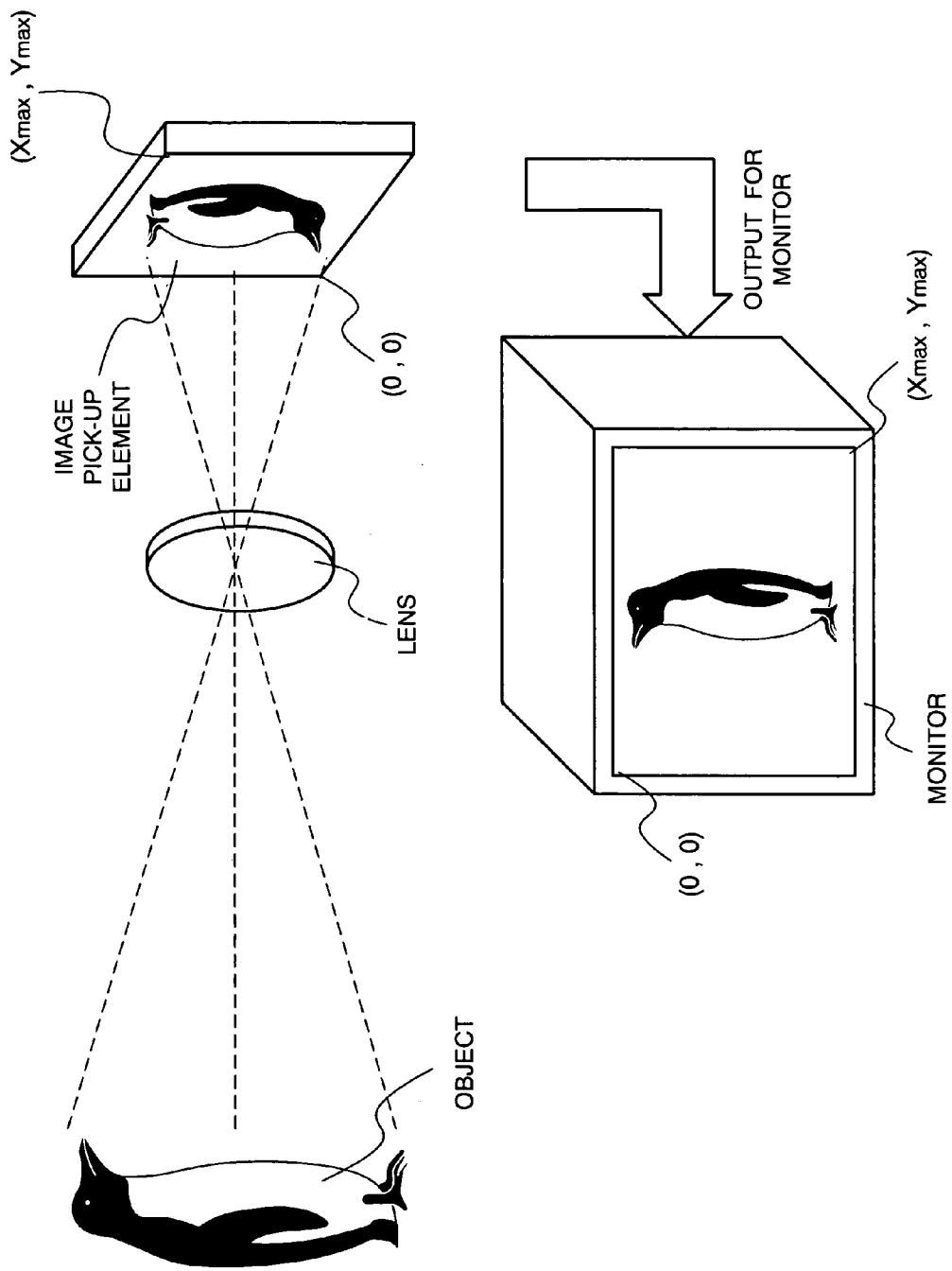
FIG. 4 is an illustration showing a manner of formation of image of contracting optical system and of outputting picked up image to a monitor.

Next, a manner of formation of image of the object on the image pick-up element will be discussed. Before giving discussion with respect to image formation of the rotary mirror type camera 200 shown in FIG. 3, manner of image formation in the typical contracting optical system, and manner of displaying the image picked-up by the image pick-up element will be discussed with reference to FIG. 4. Referring to FIG. 4, a reflection light from the object (penguin facing toward left as viewed from the lens side) passes through the lens as the contracting type optical system to form the image on the photosensitive surface of the image pick-up element with reversed the head and tail. The image pick-up elements are arranged to place (0, 0) at left lower position and ($X_{max}$, $Y_{max}$) at right upper position with respect to the photosensitive surface of the image pick-up element. The image corresponding to the photosensitive element (0, 0) is displayed on left upper position on the monitor, and images corresponding to the photosensitive elements (1, 0, (2, 0) . . . are displayed in horizontally right direction in sequential order, and then the pixel corresponding to the photosensitive element ($X_{max}$, $Y_{max}$) is displayed at the right lower position on the monitor. Then, the monitor screen shows the image of the penguin facing toward left as seen from the lens side.

Figure 5:
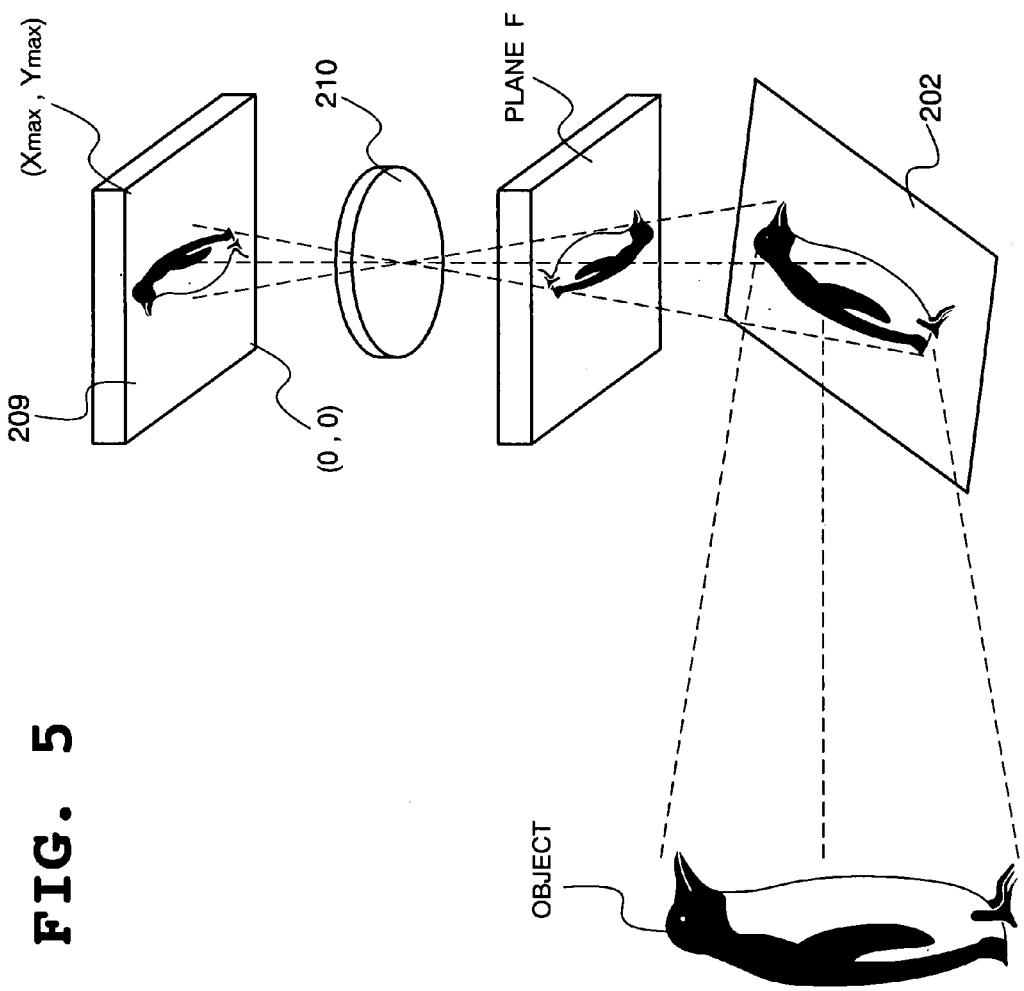
FIG. 5 is an illustration showing a manner of formation of image in the first embodiment of a rotary mirror type camera.

Next, manner of formation of image via the mirror and lens with the reflection light from the object similarly to the rotary mirror type camera 200 will be discussed with reference to FIG. 5. Referring to FIG. 5, the reflected light from the object (here, penguin facing toward left as viewed from mirror 202 side) is reflected by the mirror 202 and is formed as image by the image pick-up element by the lens 210. The image pick-up element corresponding to the pixel (0, 0) is located at left lower position with respect to the photosensitive surface of the image pick-up element and the image pick-up element corresponding to the pixel ($X_{max}$, $Y_{max}$) is located at the right upper position. For facilitating understanding of the manner of image formation, FIG. 5 shows the object as viewed on the mirror 202 and a plane F as virtual plane between the mirror 202 and the lens 210.

Figure 6:
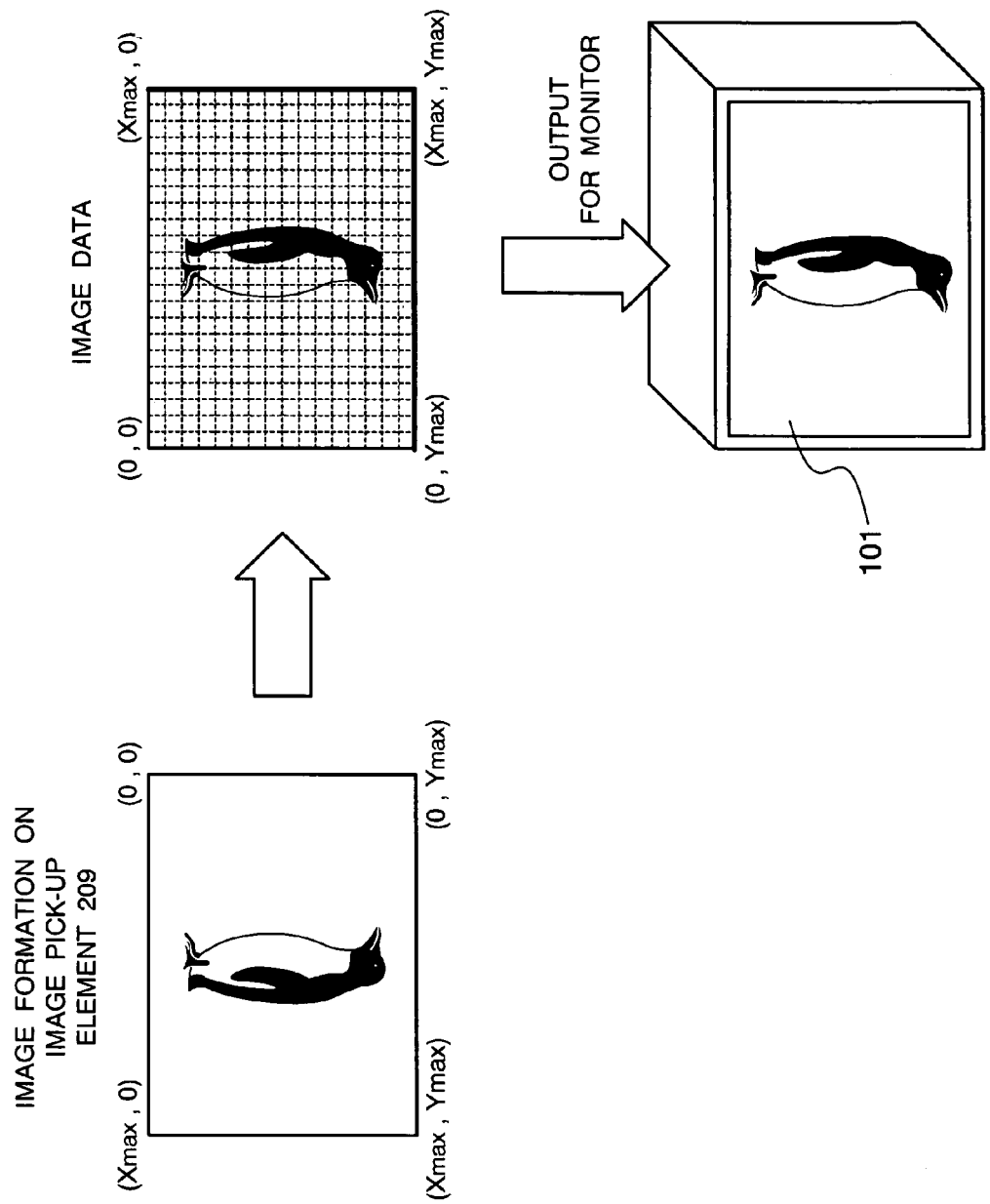
FIG. 6 is an illustration showing the image picked-up by the first embodiment of the image pick-up element and the manner of outputting of the picked-up image to the monitor.

FIG. 6 is an illustration showing a manner of displaying of the image picked up by the image pick-up element 209 on the monitor. The image formed on the photosensitive surface of the image pick-up element 209 is converted into the electric signal by the image pick-up element 209 to obtain the image data. At this time, arbitrary photosensitive element (x, y) becomes pixel (x, y) on the image data. The image data is arranged so that the image data of the pixel (0, 0) is located at left upper position and the image data of the pixel ($X_{max}$, $Y_{max}$) is located at the right lower position. By displaying this image data on the monitor, the shown image can be obtained.

[Monitor Image Viewed through Finder 108]

Figure 7:
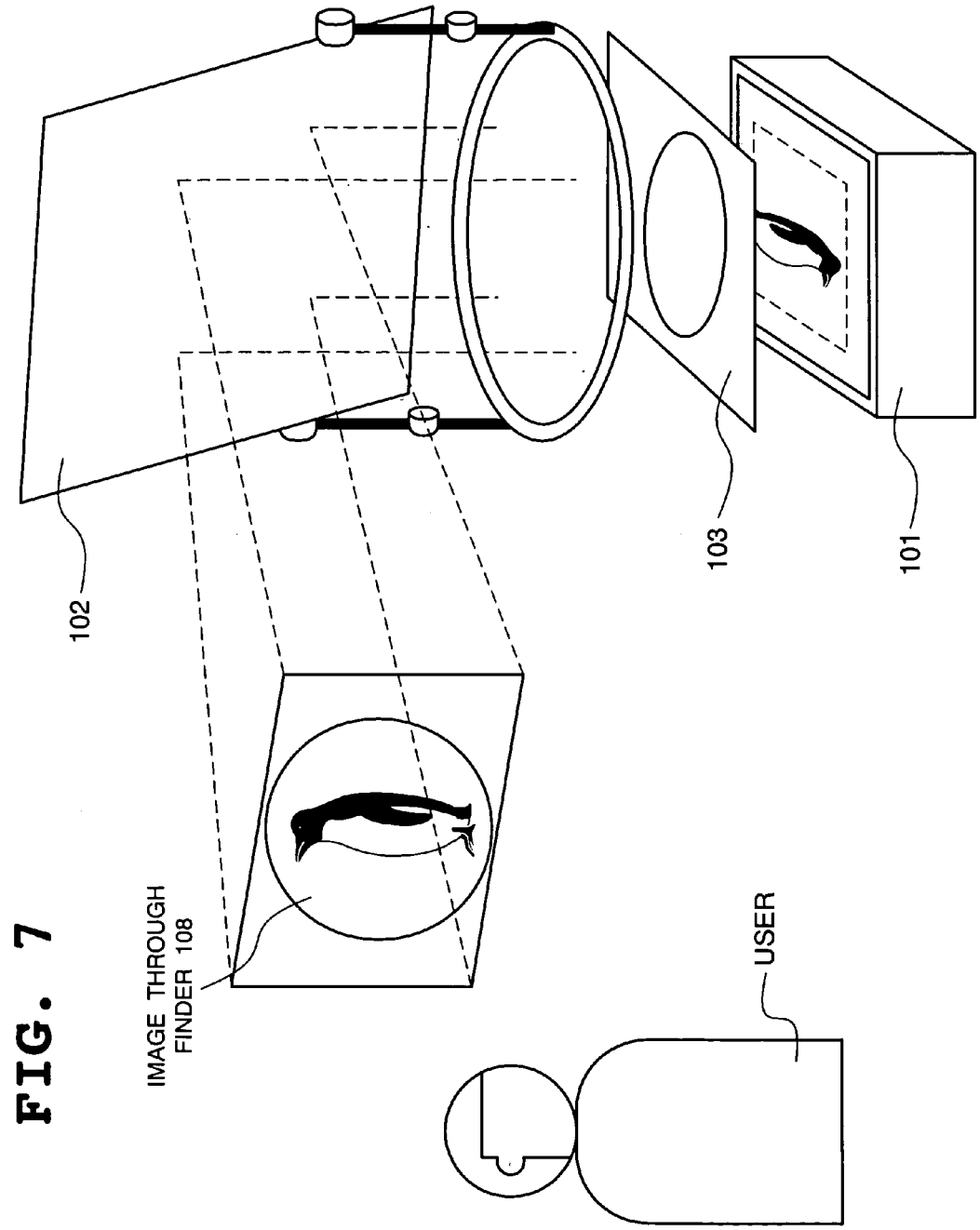
FIG. 7 is an illustration showing an image output to the first embodiment of the monitor and a manner of displaying the image to a user through a circular window and a mirror.

FIG. 7 is an illustration showing a condition where the user is viewing the image displayed on the monitor 101 via the finder 18 and the mirror 102. The image displayed on the monitor 101 is reflected by the mirror 102 through the cylinder opening portion of the circular window 103 and then output from the finder 108. The internal diameter of the ring gear 106 is selected to be sufficiently large so as not to shield the image. The image as viewed by the user across the finder 108 becomes a circular region corresponding to the opening portion of the circular window 108. The image on the monitor 101 will not be reversed up side down optically since it is not viewed through the contracting optical system different from the rotary mirror type camera 200.

[Image Formation on Image Pick-up Element 209 when Mirror 202 is Rotated]

Figure 8:
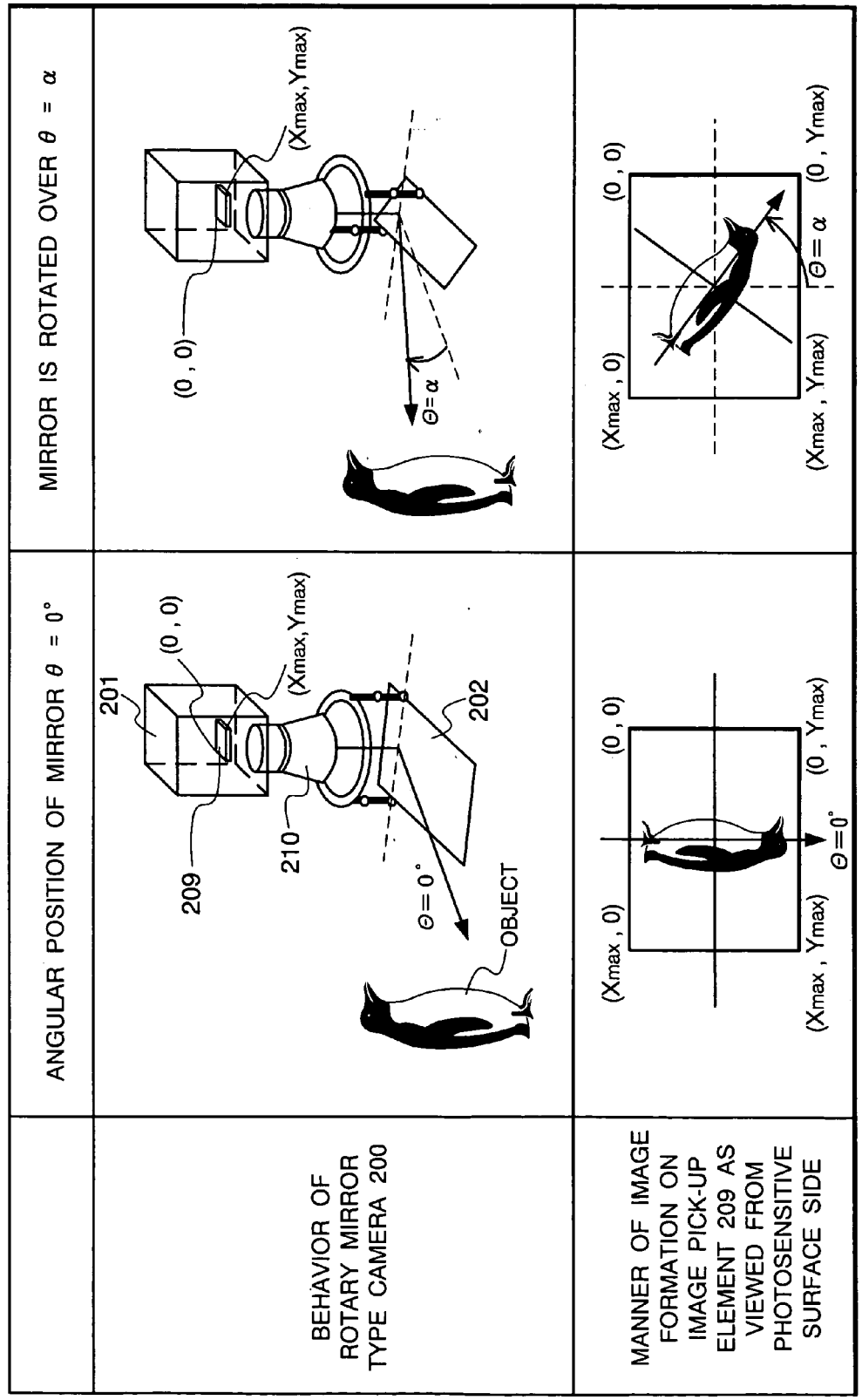
FIG. 8 is an illustration showing a manner of information formation when the first embodiment of the monitor is rotated.

FIG. 8 is an illustration showing a manner of image formation on the image pick-up element 209 of the rotary mirror type camera 200 when the mirror 202 is rotated. As discussed with reference to FIGS. 3 to 6, the reflected light from the object (here, penguin facing toward left as viewed from the mirror 202 side) presenting in image pick-up direction in the condition where the mirror 202 is in a condition of θ=0° (left upper position in FIG. 8).

Formation of image on the image pick-up element 209 is reversed in up side down manner as viewed from the photosensitive surface side (left lower position in FIG. 8). Next, the reflected light from the object (here, penguin facing toward left as viewed from the mirror 202 side) is irradiated on the image pick-up element 209 as reflected by the mirror 202 and by the lens 210 (right upper position of FIG. 8). Image formation on the image pick-up element 209 is one rotated over angle a in counterclockwise direction as compared with the case up and down direction of the object (in the direction of arrow in the drawing) when θ=0° (right lower position of FIG. 8).

[Input Image when Mirror 202 is Rotated]

Figure 9:
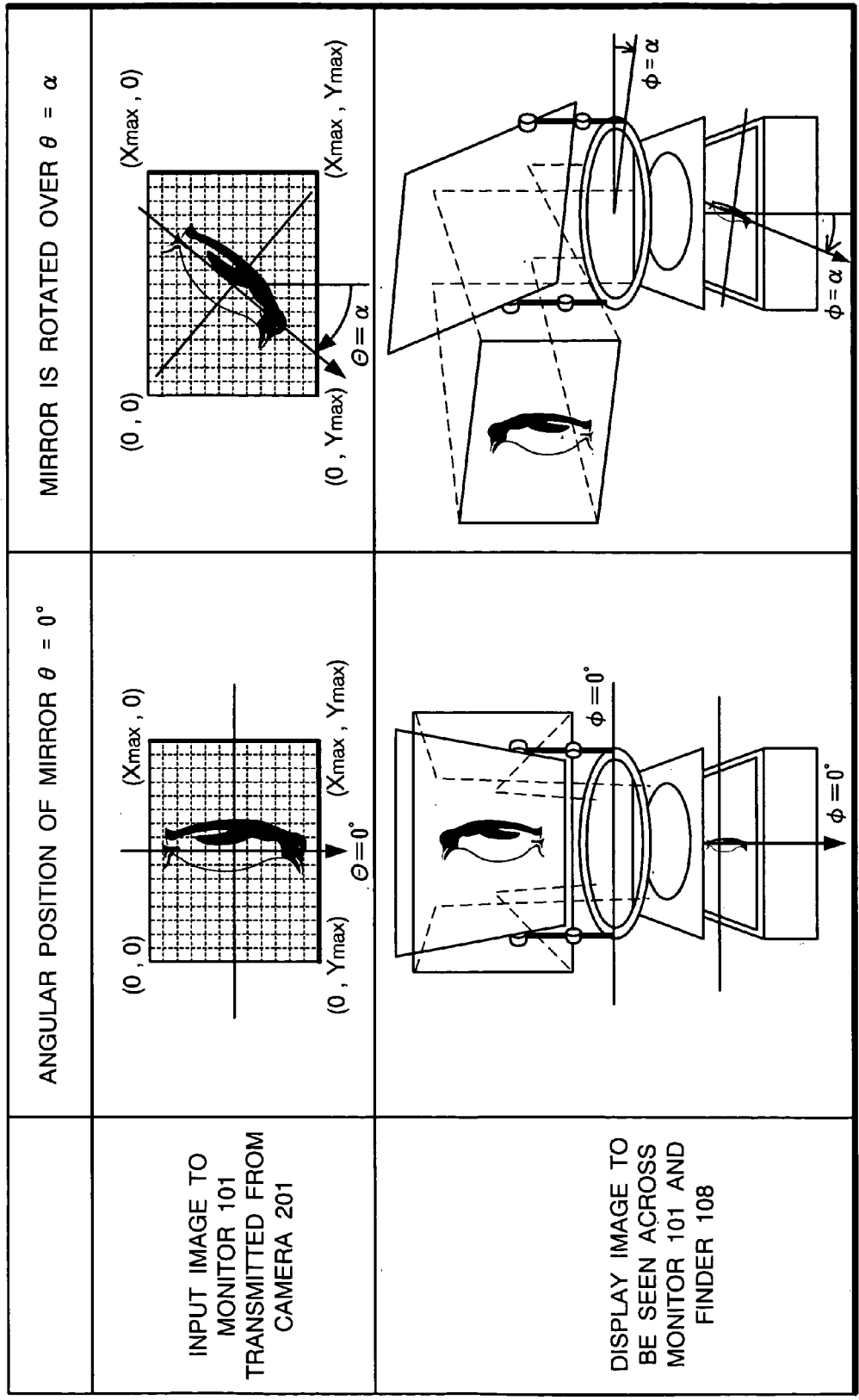
FIG. 9 is an illustration showing a behavior of input/display screen when the first embodiment of the mirror is rotated.

FIG. 9 is an illustration showing an input image transmitted from the camera 201 to the monitor 101 and the image the user may see across the finder 108, when the mirror 102 and the mirror 202 are rotated. Image formed on the image pick-up element 209 when the mirror 202 is θ=0° and θ=α (lower half of FIG. 8), is converted into the electrical signal by the image pick-up element 209 and is fed to the monitor 101 as the input image data (upper half of FIG. 9). At this time, the signal obtained by the arbitrary photosensitive element (x, y) becomes a luminance of the pixel (x, y).

The input image under the condition where the mirror is positioned in the condition of θ=0°, the image of the object is reversed in up side down manner over 180° and may not be rotated in left and right direction (left upper position of FIG. 9). This is based on correspondence between the photosensitive element of the image pick-up element 209 and the pixel of the input image. Next, the image picked-up in the condition where the mirror is rotated over θ=α, is rotated for an angle α from the position where the object is θ=0° in clockwise direction (right upper position in FIG. 9: It should be noted while the penguin as object is illustrated at the center of the screen in the drawing, it is illustrated a condition where the penguin does not face the direction of θ=0° but is facing in the direction of arrow α).

[Definition of Angular Position φ of Mirror 102]

A relative angle φ of the mirror 102 relative to the monitor is assumed that φ=0° when the straight line directed to the finder 108 from the mirror 102 matches with the longitudinal direction of the monitor 101, and clockwise direction as facing with the screen of the monitor is assumed that φ is positive direction.

[Output Image when Mirrors 102 and 202 being Rotated]

In the case where the input image when the angular position θ of the mirror 202 is 0°, is displayed on the monitor 101, assuming that the relative angle φ of the monitor 101 and the mirror 102 is 0°, the image viewed through the finder 108 becomes an erect image of the object as viewed from the position where the rotary mirror type camera 200 is installed (left lower position of FIG. 9).

Namely, the control circuit 208 is constructed to cause rotation of the mirror 202 for the angle α in response to user's operation of the mirror 102 for the arbitrary angle α with setting the initial values of the angular position φ of the mirror 102 and the angular position θ of the mirror 202 are both 0°. The erect image as viewed from the position where the rotary mirror type camera 200 is installed can be constantly provided to the user through the finder 108.

On the other hand, in order to match the angular position of the mirror 102, namely the angular position of the casing 110, with the angular position of the mirror 202, it becomes necessary to reverse the display direction of the monitor (vertically upward in case of FIG. 2) and the image pick-up direction of the camera 201 (vertically downward in FIG. 2) for 80°. As set forth above with reference to FIG. 4, this is necessitated for the image with the incident light beam is formed on with the light the image pick-up element in reversed form in up side down fashion by the lens of the camera If an optical system, in which the light beam from the object is not reversed in up side down, the foregoing becomes unnecessary. It should be noted that the case where the optical system, in which the light beam from the object is not reversed and the display direction of the monitor 101 and the image pick-up direction of the camera are matched will be discussed later in terms of the third embodiment.

It should be noted that, in the shown embodiment, display direction of the monitor 101 in the rotary mirror type display apparatus 100 is vertically upward and the image pick-up direction of the camera 201 in the rotary mirror type camera 200 is vertically downward. However, no problem would be arisen even in directing in opposite directions, namely the display direction of the monitor 101 is vertically downward and the image pick-up direction of the camera is vertically upward.

Furthermore, when the rotary mirror type camera 200 can be installed at high elevation position, such as rooftop or top of the mountain, the camera 201 may be installed with image pick-up direction less than or equal to 90° relative to vertically upward for observing downward sight. The display direction and the image pick-up direction may be appropriately selected depending upon sites where the rotary mirror type display apparatus 100 and the rotary mirror type camera 200 are installed. While not limitative, it is preferred that the rotary mirror type display apparatus 100 and the rotary mirror type camera 200 are installed so that an angular difference of the image pick-up direction of the camera 201 and the display direction of the monitor 101 is within a range of more than or equal to 90° and less than or equal to 270°.

[Function of Circular Window 103]

Figure 10:
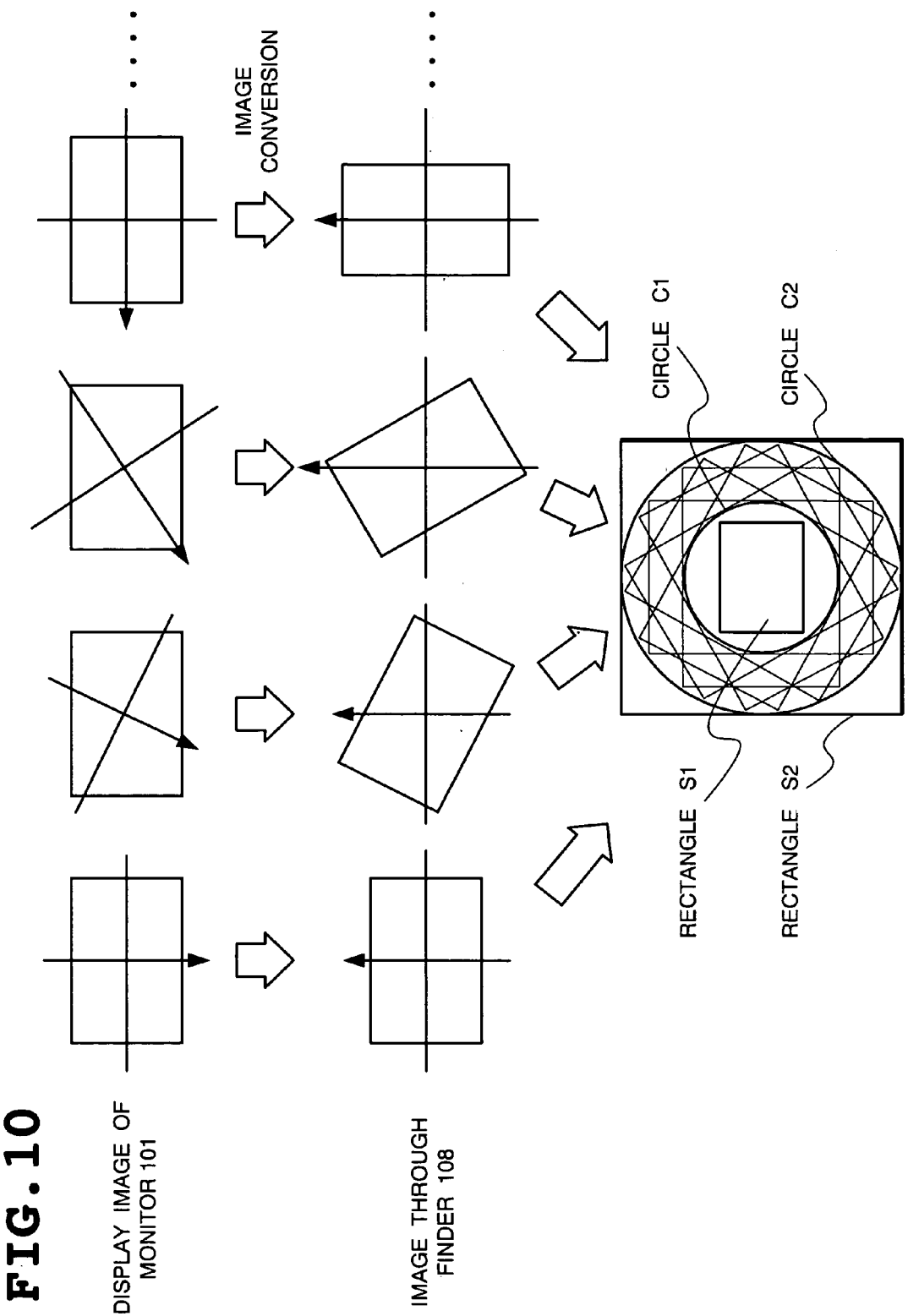
FIG. 10 is an illustration showing behavior of rotation of the display image associating with rotation of the first embodiment of the mirror.

FIG. 10 is an illustration showing a manner of rotation of the display image of the monitor 101 associating with rotation of the mirror 202 and an image to be seen cross the finder 108 by rotation of the mirror 102. In FIG. 10, the arrow represents head and tail direction of the object and the arrow is directed vertically upward. When the mirror 202 is rotated, the image to be displayed on the monitor 101 is rotated as shown (upper portion in FIG. 10). If the mirror 102 is rotated at the corresponding magnitude as rotation of the mirror 202, the user may see the erected image through the finder 108 as the head and tail direction of the object matches with the up and down direction of the image (intermediate portion of FIG. 10). It should be noted that if the mirror 102 is sufficiently large, the user may see rotated rectangular image.

When entire image of the monitor 101 seen across the finder when the mirrors 102 and 202 are placed at various angular positions, are overlain in coaxial fashion, there are a circle C2 constantly enclosing the entire screen, a circle C1 in which image is constantly present, a rectangle S1 internally contacting with the circle C1 and a rectangle S2 externally contacting with the circle C2 (lower portion of FIG. 10). Accordingly, for example, when the image of the region corresponding to the circle C1 is to be provided to the user among the screen of the monitor 101, the opening portion of the circular window 103 may be corresponded to the circle C1.

Thus, instead of rotary rectangular image giving uncomfortable feeling, circular image can be seen constantly irrespective of rotational angle of the mirrors, 102 and 202. When image region corresponding to the circle C1 is to be provided to the user, a part of the picked-up image data is not displayed to make information amount to be image data smaller, namely field angle becomes narrower.

Figure 11:
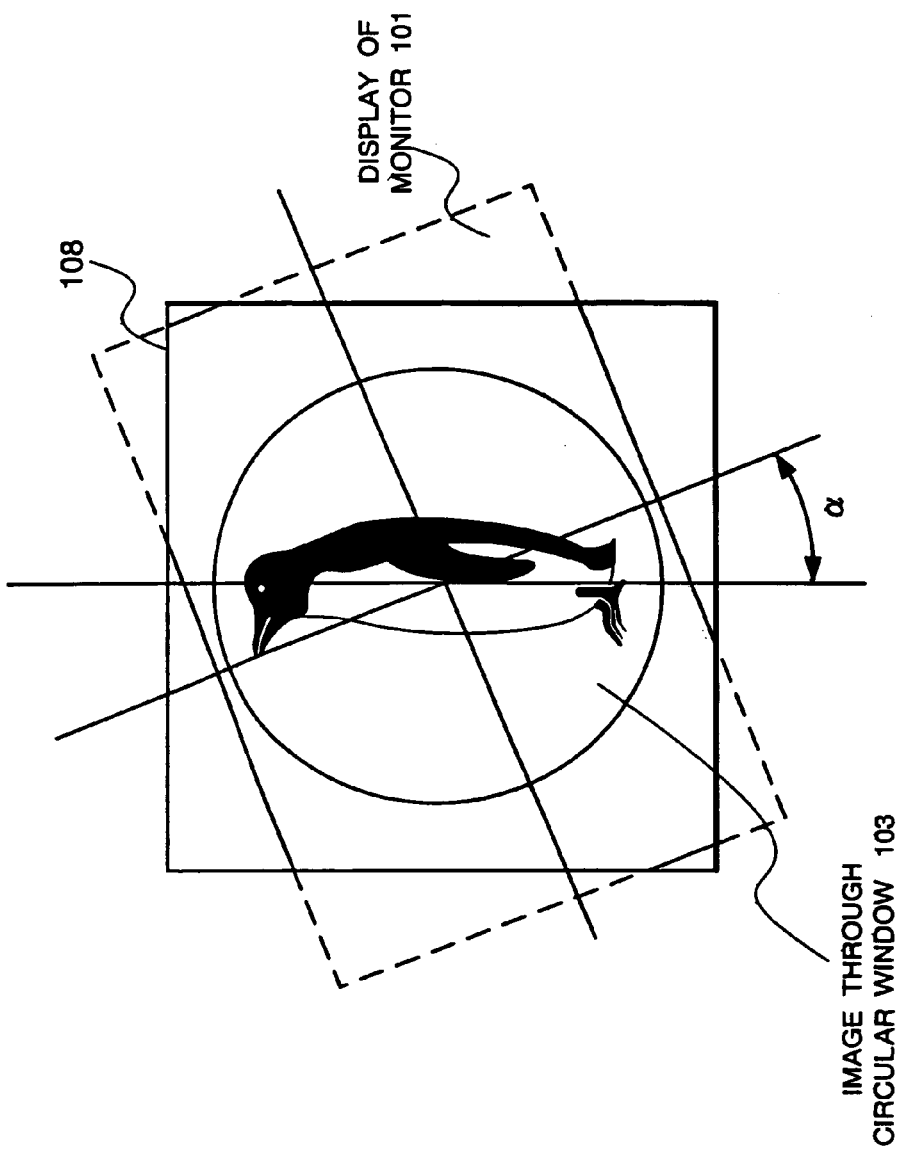
FIG. 11 is an illustration showing a finder, a circular window, a screen of the monitor and an image to be seen by the user when a circular window having an opening portion corresponding to the circle of the first embodiment.

FIG. 11 is an illustration showing a display image of the finder 108, the circular window 103 and the monitor 101 when the circular window 103 having the opening portion corresponding to the circle C1. FIG. 11 shows the case where the mirrors 102 and 202 are rotated over the angle α, the circular image corresponding to the opening portion of the circular window 103 can be seen in erected fashion through the finder 108.

It should be noted that the region corresponding to the rectangles S1 and S2 are to be provided to the user will be discussed in the second embodiment.

As set forth above, the user may direct the mirror 202 to the direction desired to monitor by rotating the casing 110, and at the same time, the image from the camera can be seen across the finder 108. Namely, at the site where the rotary mirror type display apparatus 100 is installed, entire direction of 360° around the site where the rotary mirror type camera 200 is installed, can be seen. Furthermore, similarly to the case of the optical periscope or the electronic periscope discussed in the prior art, visceral azimuth identification and change of direction becomes possible by matching the direction of the user and the absolute azimuth of image pick-up direction of the rotary mirror type camera 200 or maintaining relative angular variation matched.

Second Embodiment

[Construction]

Figure 12:
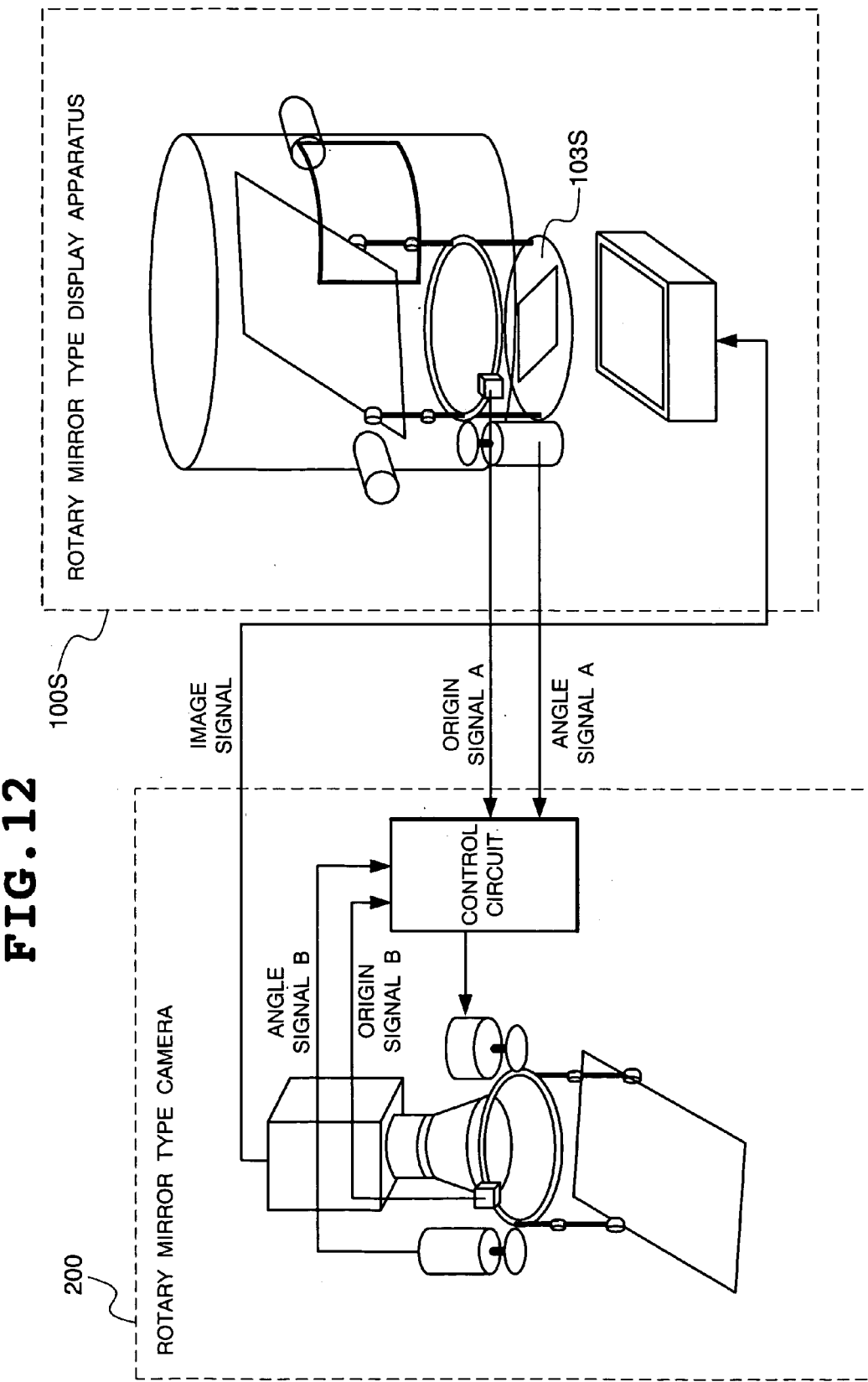
FIG. 12 is a constructional illustration of the second embodiment of the camera system according to the present invention.

FIG. 12 is an illustration showing a construction of the second embodiment of the camera system according to the present invention.

Comparing the shown embodiment and the first embodiment with making reference to FIGS. 12 and 2, there are two differences. First difference is that a rectangular window 103S is employed in the second embodiment in place of the circular window 103 employed in the first embodiment. Another difference is that while the circular window 103 is filed on the side of the monitor 101 (namely, the circular window 103 is separated from the casing 110) in the first embodiment, the rectangular window 103S is integral with the ring gear 106, namely fixed on the side of the casing 110 (since the ring gear 106 is fixed to the casing 110 similarly to the first embodiment). Other constructions are identical to the foregoing first embodiment.

Figure 13:
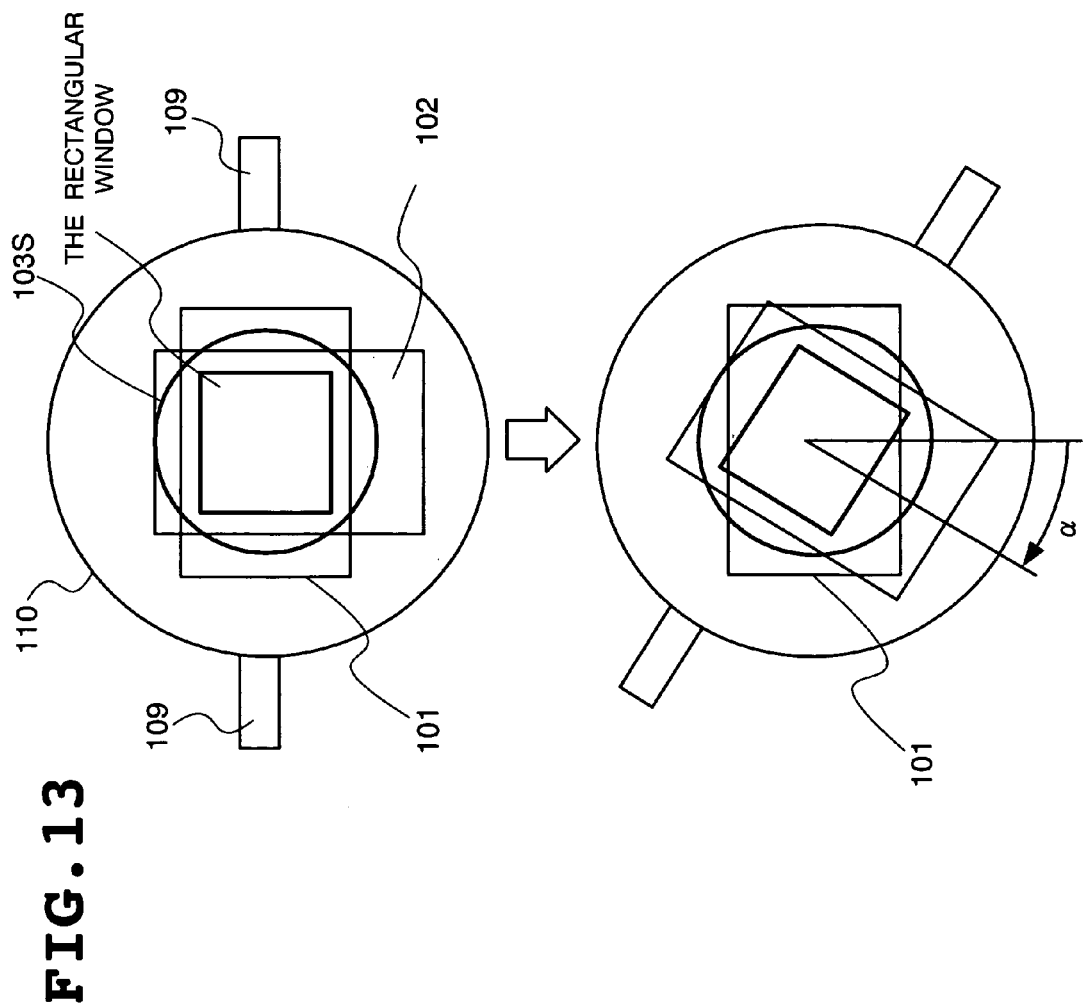
FIG. 13 is an illustration showing the second embodiment of a rotary mirror type display apparatus according to the present invention.
Figure 14:
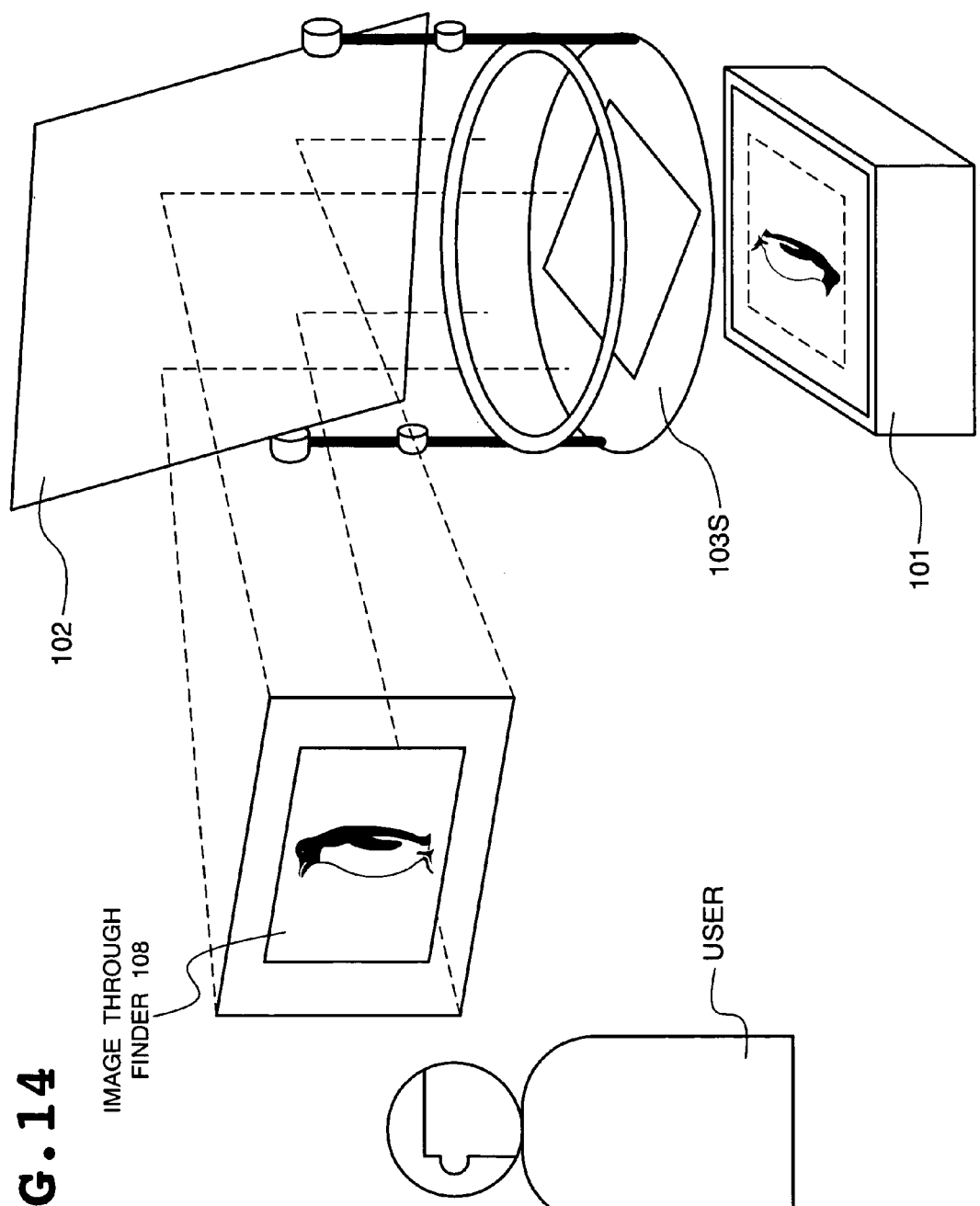
FIG. 14 is an illustration showing a manner to display the image output to the second embodiment of the monitor to the user via a rectangular window and the mirror.

FIG. 13 is an illustration showing the second embodiment of the rotary mirror type display apparatus 100S according to the present invention as viewed from the above. The illustration on upper side in FIG. 13 is the case where the relative angle φ=0° of the mirror 102 relative to the monitor 101, and illustration of the lower side is the case where φ=α. The rectangular window 103S is fixed so that respective edges of the rectangular opening portion becomes parallel to respective edges of rectangle as projection on the horizontal plane of the mirror (shown mirror 102 is quadrangular shape). When the user grips the handle 109 and rotates the casing 110 the mirror 102 and the rectangular window 103S are rotated associating therewith. As set forth above, the image on the monitor 101 to be provided to the user via the rectangular window 103S and the mirror 102 becomes constantly erected rectangular image as shown in FIG. 14 irrespective of the angle φ.

It should be noted that the circular window 103 in the first embodiment is fixed on the side of the monitor 101, namely separated from the casing 110. However, when the circular window is used, the window may be fixed either the monitor 101 or the casing 110 since the opening portion is circular. In such case, even when the circular window is rotated together with the casing 110, the opening portion which the user may see is circle. While the circular window will not be so heavy in viewpoint of construction, the circular window is fixed on the side of the monitor 101 in the first embodiment, for reducing weight of the rotating portion (casing 110, the mirror 102 and so forth) as much as possible.

[Opening Portion of Rectangular Window 103S]

Figure 15:
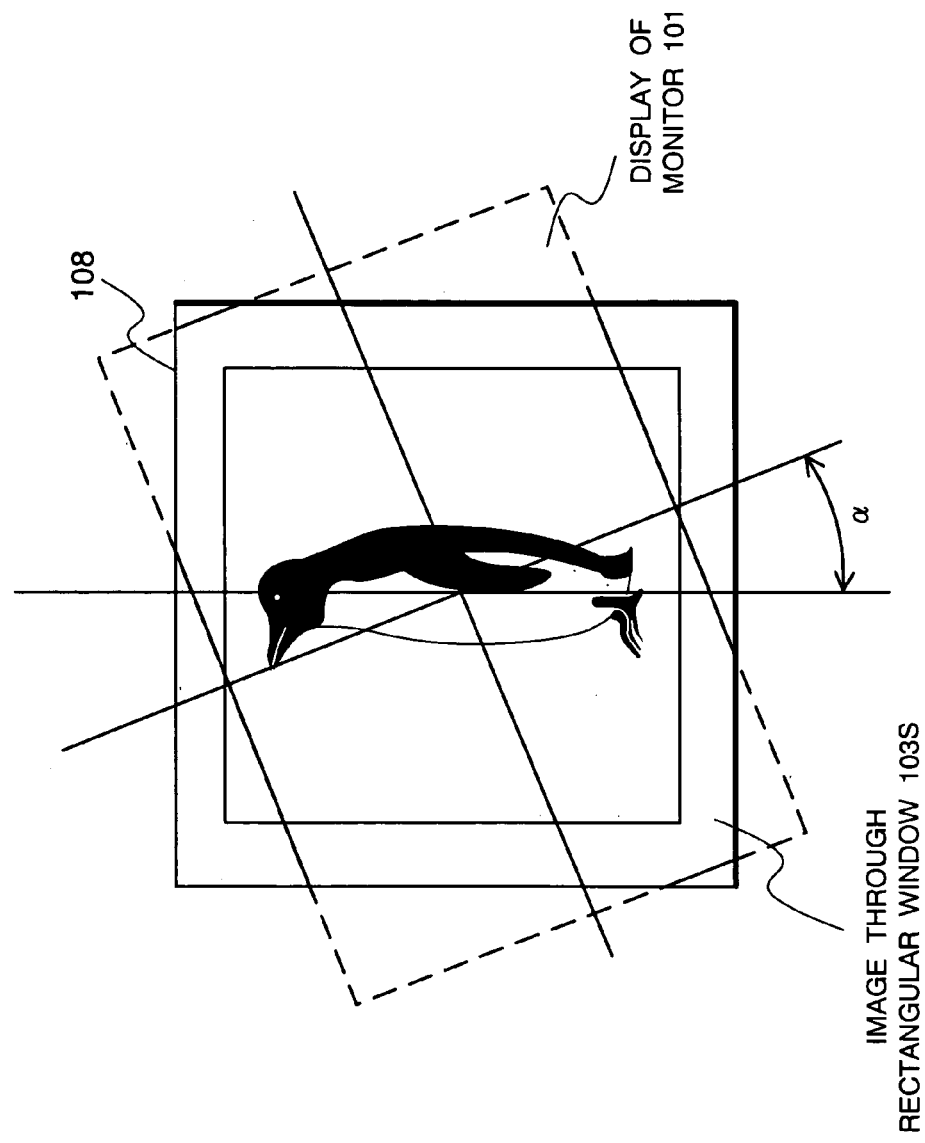
FIG. 15 is an illustration showing a finder, a rectangular window, a screen of the monitor and an image to be seen by the user when a rectangular window having an opening portion corresponding to the rectangle of the second embodiment.

The rectangular opening of the rectangular window 103S may be of sizes corresponding to the rectangles S1 and S2 as shown in FIG. 10, for example. Merit and demerit in forming the window in rectangle S1 or S2 is the same as those in forming the window in circle C1 or C2 as set forth in the first embodiment. FIG. 15 is an illustration showing a screen of the finder 108, the rectangular window 103S and the monitor 101 and the image to be seen by the user. FIG. 15 shows the image to be seen from the finder when the casing is rotated over an angle α.

[Arrangement of Circular Window or Rectangular Window between Finder 108 and Mirror 102]

In the first and second embodiments, the circular window 103 or the rectangular window 103S is arranged between the monitor 101 and the mirror 102. However, no problem will be arisen even when the circular window 103 or the rectangular window 103S is arranged between the finder 108 and the mirror 102. However, naturally, in this case, the circular window 103 or the rectangular window 103S has to be fixed on the side of casing 110.

Third Embodiment

[Construction, Operation]

Figure 16:
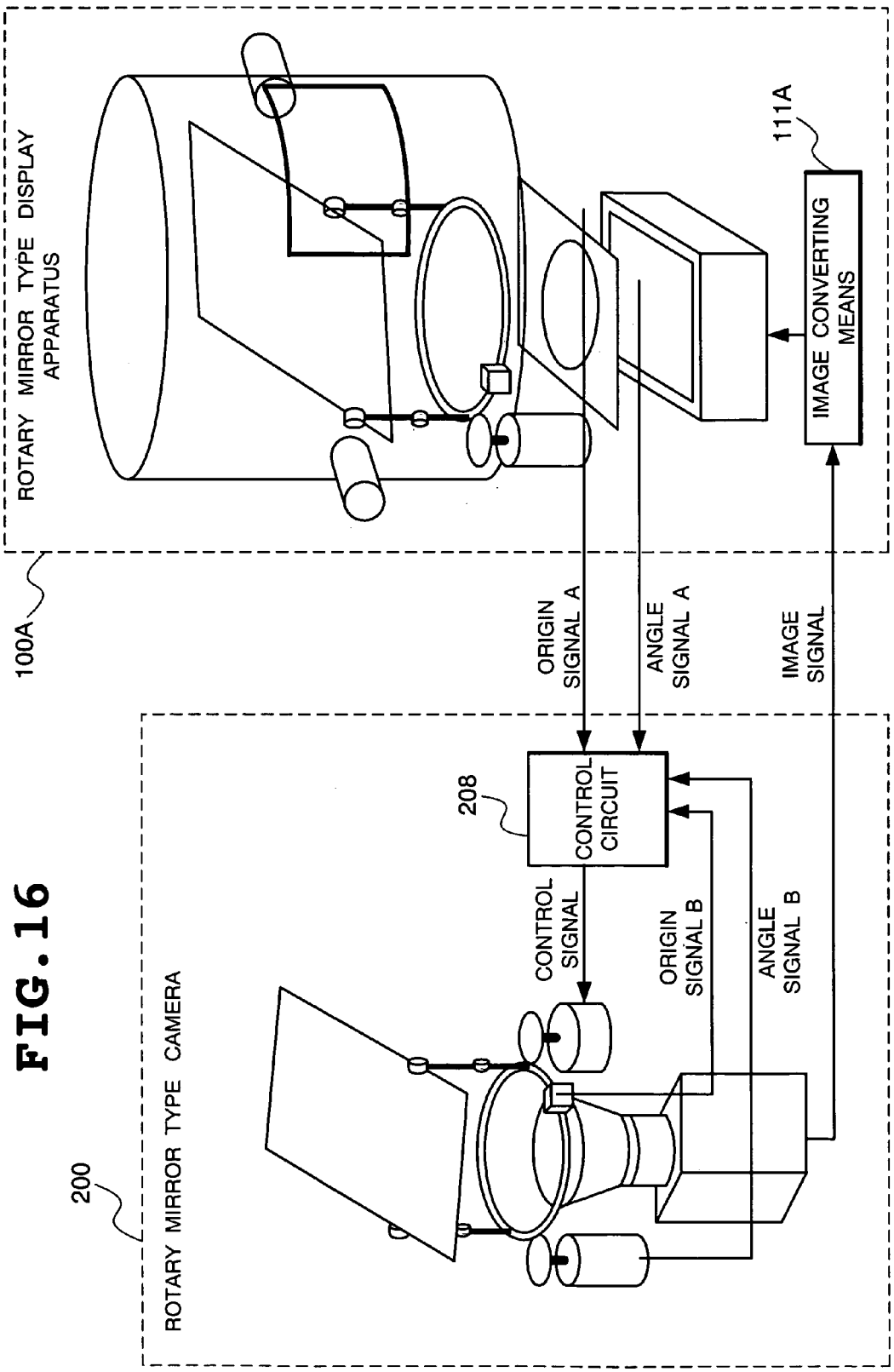
FIG. 16 is a constructional illustration of the third embodiment of the camera system according to the present invention.

FIG. 16 is an illustration showing a construction of the third embodiment of the camera system according to the present invention.

Referring to FIG. 16, the shown embodiment of the camera system is constructed with the rotary mirror type display apparatus 100A, in which image conversion means 111A is added to the rotary mirror type display apparatus 100 in the first embodiment, and the rotary mirror type camera 200. Comparing the shown embodiment and the first embodiment with reference to FIGS. 16 and 2, there are two differences. The first difference is that orientation of the camera 201 in the rotary mirror type camera 200 in the first embodiment is vertically downward, and in the shown embodiment, the orientation of the camera 201 is vertically upward. Another difference is that the image conversion means 111A is added to the rotary mirror type display apparatus 100.

In the shown embodiment and the first embodiment, the construction other than foregoing two different points, are the same in basic construction. Therefore, detailed discussion for those common construction will be omitted in order to avoid redundant disclosure and whereby to keep the disclosure simple enough to facilitate clear understanding of the present invention. The following discussion will be given for necessity of the image converting means 111A due to arrangement of the rotary mirror type camera 200 with orienting the image pick-up direction vertically upward.

[Formation of Image to Image Pick-up Element 209]

Figure 17:
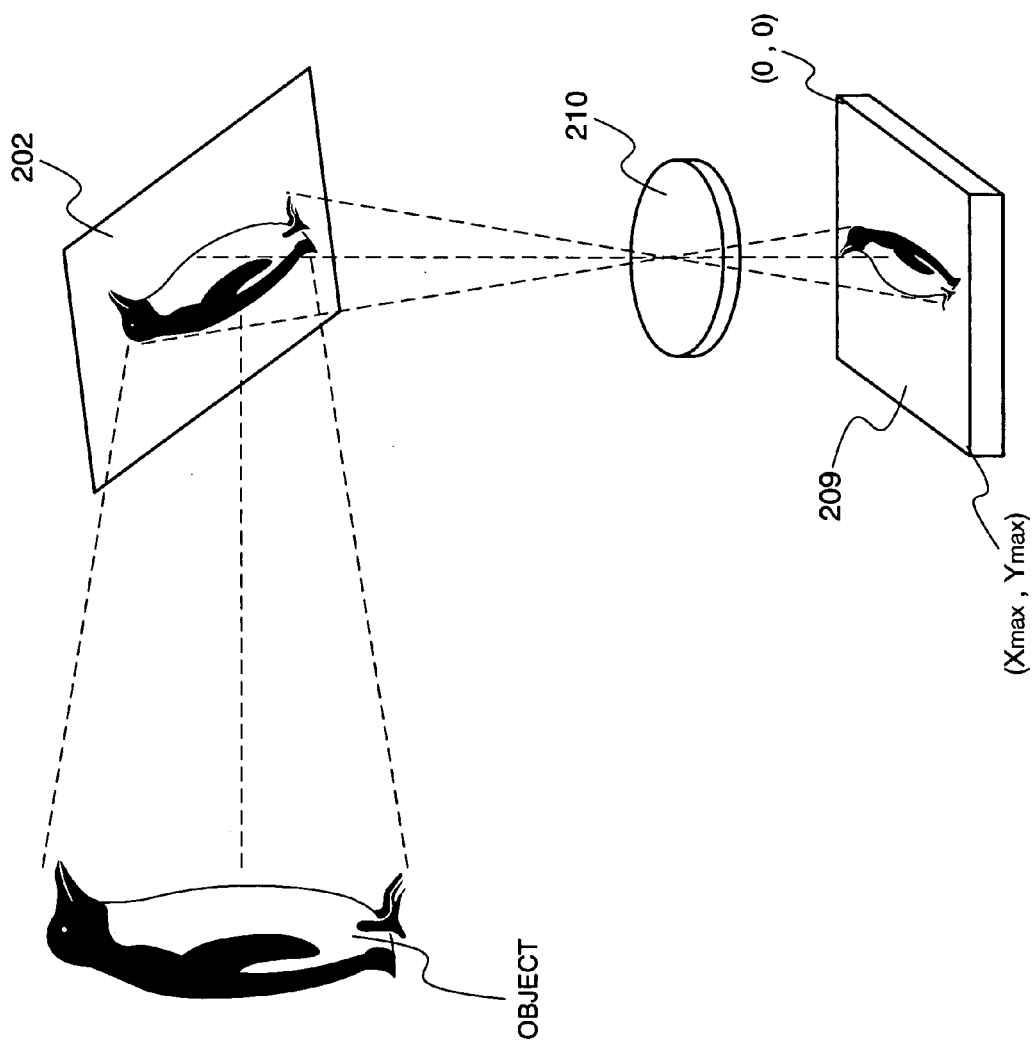
FIG. 17 is an illustration showing a manner of image formation in the third embodiment of the rotary mirror type camera according to the present invention.

FIG. 17 is an illustration showing a manner of formation of image in the shown embodiment of the rotary mirror type camera 200. Referring to FIG. 17, a reflection light from the object (penguin facing toward left as viewed from the side of mirror 202) is reflected by the mirror 202 and forms an image on the image pick-up element 209 by the lens 210. The image pick-up element is arranged to place the pixel (0, 0) at right upper position and the pixel ($X_{max}$, $Y_{max}$) at left lower position as directed to the photosensitive surface of the image pick-up element as shown. This arrangement is the same as the image pick-up element 209 in the first embodiment. For facilitating image formation, view of the object on the mirror is shown.

[Formation of Image on Image Pick-up Element 209 when Mirror is Rotated]

Figure 18:
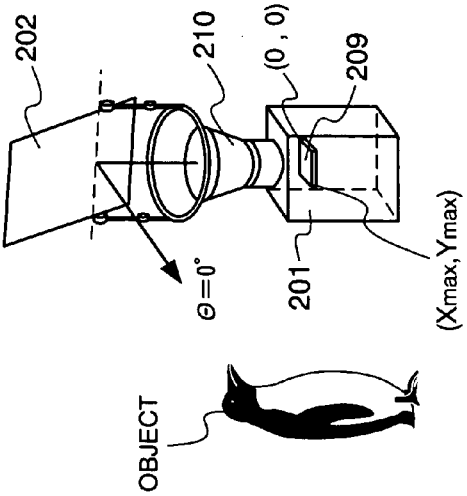
FIG. 18 is an illustration showing a manner of image formation when the third embodiment of the mirror of the invention is rotated.

FIG. 18 is an illustration showing a manner of image formation on the rotary mirror type camera 200 and the image pick-up element 209 when the mirror 202 is rotated, in the shown embodiment.

Each photosensitive element of the image pick-up element 209 represents (X, Y) coordinates similar to the first embodiment, the coordinate system is established with setting the right upper position as (0, 0), for horizontally aligned pixels (1, 0), (2, 0) . . . ($X_{max}$, 0) toward left in sequential order, and the lowermost and left pixel ($X_{max}$, $Y_{max}$) On the other hand, the angular position θ relative to the mirror 202 of the camera 201 is positive as rotated in clockwise direction as viewed in the direction toward the photosensitive surface of the image pick-up element 209 with setting the condition oriented perpendicular to X-coordinate and toward positive direction of Y-coordinate as θ=0° in the (X, Y) coordinate system representative of respective photosensitive element of the image pick-up element 209.

The reflected light from the object (penguin facing-toward left as viewed from the side of the mirror 202) presenting in the image pick-up direction in the condition where angular position of the mirror 202 is θ=0°, forms an image on the image pick-up element 209 by the lens 210 as reflected by the mirror 202 (left upper portion in FIG. 18). Formation of image on the image pick-up element 209 is not reversed up side down over 180° as viewed from the side of the photosensitive surface. Namely, the image of the object as viewed from the position of the mirror 202 is formed (left lower portion in FIG. 18). next, the reflection light from the object (penguin facing toward left as viewed from the side of the mirror 202) presenting in the image pick-up direction in the condition where the mirror 202 is placed θ=α, forms image on the image pick-up element 209 by the lens 210 as reflected by the mirror 202.

Formation of image on the image pick-up element 209 is rotated over the angle α in clockwise direction when θ=0° in up and down direction of the object (direction of arrow in the drawing (right lower portion in FIG. 18).

[Image Conversion Process in Image Conversion Means 111A]

The image formed on the photosensitive surface of the image pick-up element 209 is converted into an electrical signal to be the image data. The image converting means 111A feeds an original image data to the monitor 101 through conversion process. Hereinafter, with taking the condition where the mirror 202 is placed at θ=α as example, conversion system will be discussed with reference to FIG. 19.

Figure 19:
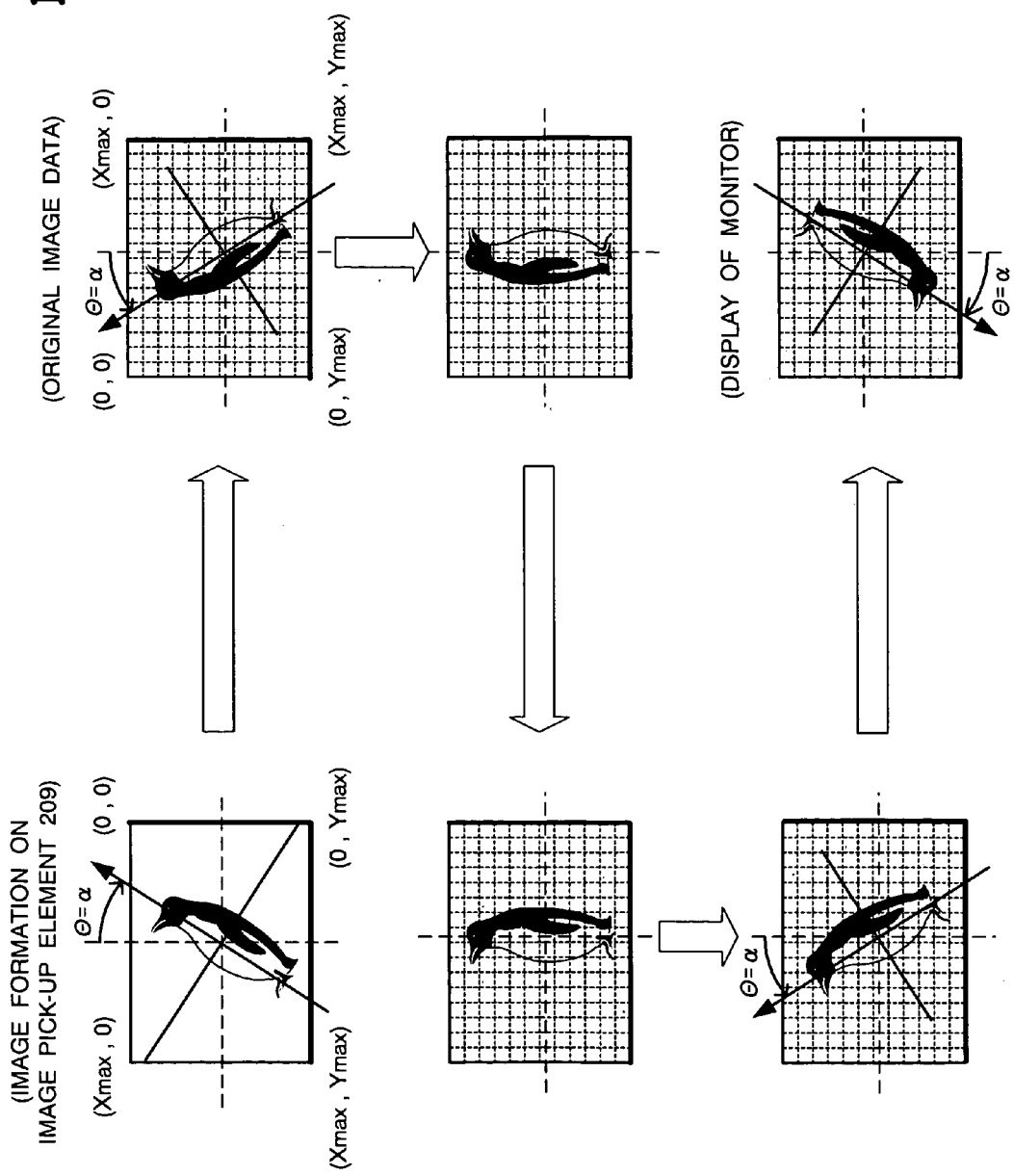
FIG. 19 is an illustration showing a manner of image conversion process in image conversion means when $\theta=\alpha$.

The image formed on the photosensitive surface of the image pick-up element 209 is converted into the electric signal by the image pick-up element 209 to generate an original image data (left upper portion→right upper portion in FIG. 19). The image conversion means 111A is rotated over θ=α in clockwise direction about the center of the image of the original image data (right upper portion→right center portion in FIG. 19). Next, after left and right conversion for reversal about vertical axis extending through the center of the image (right center portion→left center portion in FIG. 19), the image is rotated about the center of the image over θ=α in counterclockwise direction (left center portion→left lower portion in FIG. 19). Finally, converting for reversal in up side down direction about horizontal axis extending through the center of the image (left lower portion→right lower portion in FIG. 19), to feed a resultant image to the monitor 101.

Vertical or left and right reversal or rotation conversion process is quite basic image conversion process. By multiplying the coordinates (x, y) indicative of each pixel by conversion matrix, coordinates after conversion can be calculated. Since these processes are not essential to the present invention, detailed discussion will be omitted.

How the image displayed on the monitor 101 be seen by the user across the finder 108 is similar to that seen across the finder 108 in the first embodiment. Discussion has been given with respect to the image viewed on the monitor for FIGS. 7 and 9 and thus further discussion will be omitted.

[Merit of Third Embodiment]

As set forth above, the rotary mirror type display apparatus 100 is constructed with the rotary mirror type display apparatus 100A adding the image conversion means 11A. The rotary mirror type display apparatus 100A and the rotary mirror type camera 200 may be arranged with matching the display direction of the monitor and the image pick-up direction of the camera 201, particularly in vertically upward.

Figure 20:
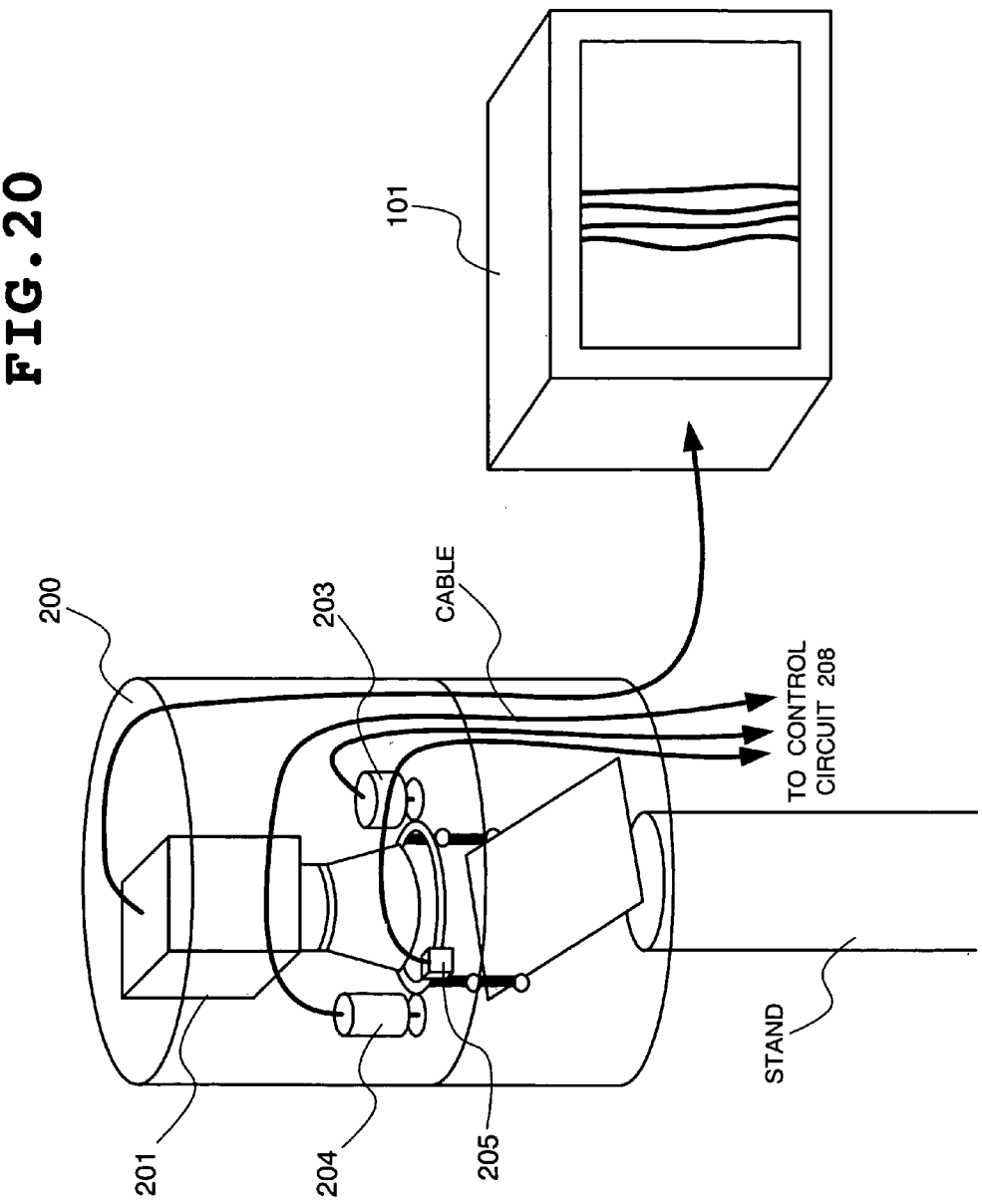
FIG. 20 is an illustration showing a condition where a connection cable enters within a view field when the first embodiment of the rotary mirror type camera is installed on a stand.
Figure 21:
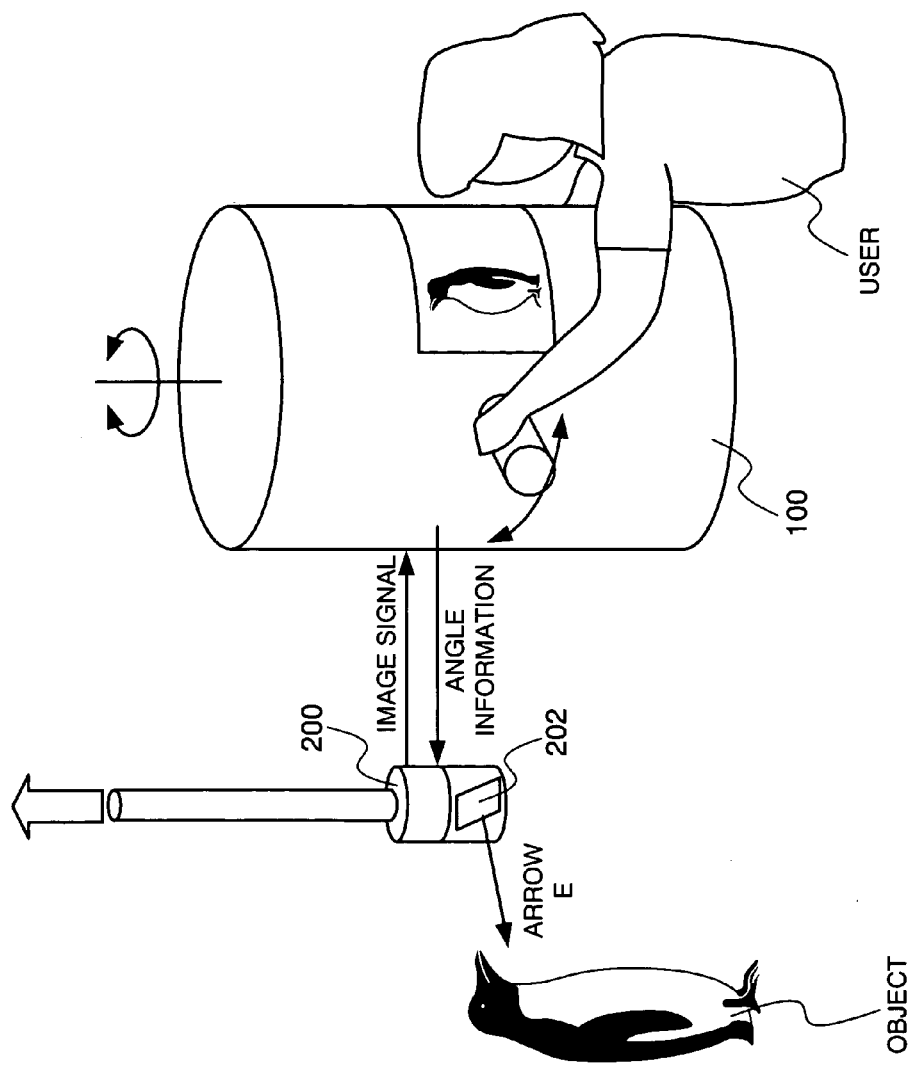
FIG. 21 is an illustration showing an external view of the first embodiment of the present invention in the case where the rotary mirror type camera is hanged from a ceiling.

Applying the present invention is practical operation, the rotary mirror type camera 200 is often fixed on the tip end of a stand placed on the floor as shown in FIG. 1. However, when the rotary mirror type camera 200 is fixed on the stand with directing the image pick-up direction of the camera 201 as in the first embodiment, the connection cables of the camera 201, the motor, 203, the encoder 204, the origin sensor 205 and so forth may block a part of view field as shown in FIG. 20. However, as set forth above in connection with the third embodiment, when the camera 201 can be installed with orienting the image pick-up direction vertically upward, such problem can be avoided.

It should be noted that the rotary mirror type camera 200 is not necessarily mounted on the stand. For example, it is often hang the camera from the ceiling or fixed on the ceiling. In such case, by wiring the connection cable on the side of the ceiling, the connection cable will never enter into the view field even through the image pick-up direction of the camera is directed vertically downward as in the first embodiment. Namely, depending upon the condition of the sites where the rotary mirror type display apparatus 100 and rotary mirror type camera 200 are installed, the first and third embodiments are selectively used to determine orientation of the monitor 101 and the camera 201, respectively.

It should be noted that, in the shown embodiment, discussion has been given for the example where the display direction of the monitor 101 in the rotary mirror type display apparatus 100 and the image pick-up direction of the camera 201 in the rotary mirror type camera 200 are both directed in vertically upward. However, it may not cause problem even when the display direction of the monitor 101 and the image pick-up direction of the camera are set in vertically downward.

Furthermore, when the rotary mirror type camera 200 is installed at high elevation position, such as rooftop of the building or top of the mountain, the image pick-up direction of the camera may be installed with tilting in an angle less than or equal to 90° with respect to vertical direction to enable observation of downward sight. While not limitative, it is preferred that the rotary mirror type display apparatus 100 and the rotary mirror type camera 200 are installed so that an angular difference of the image pick-up direction of the camera 201 and the display direction of the monitor 101 is within a range of more than or equal to 90°.

Fourth Embodiment

Figure 22:
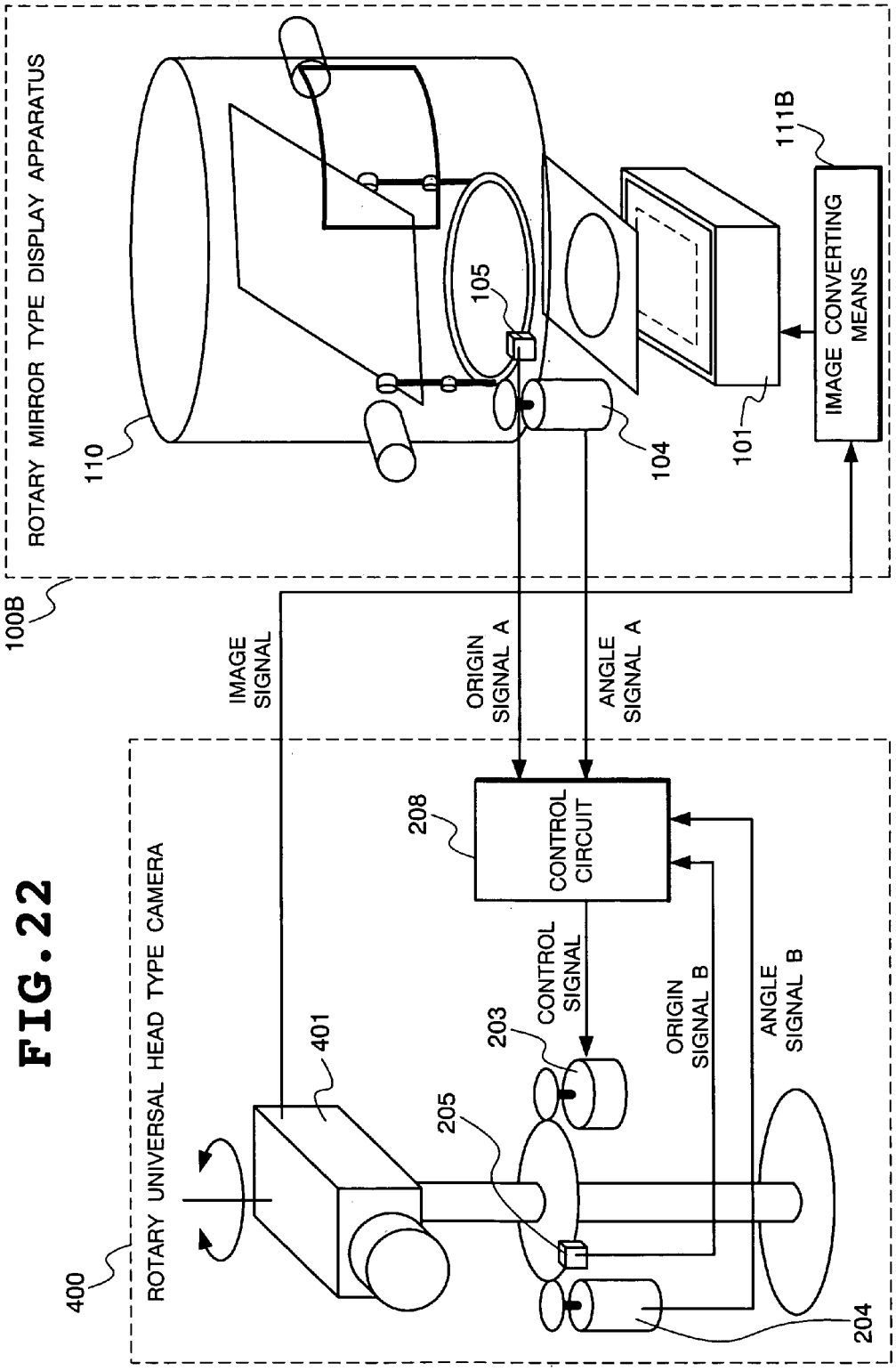
FIG. 22 is a constructional illustration of the fourth embodiment of the camera system according to the present invention.

[Construction]
FIG. 22 is an illustration showing a construction of the fourth embodiment of the camera system according to the present invention.

Referring to FIG. 22, the shown embodiment of the camera system is constructed with a rotary mirror type display apparatus 100B and a rotary universal head type camera 400. The rotary mirror type display apparatus 100B is constructed by adding image conversion means 111B to the rotary mirror type display apparatus 100 in the first embodiment, and other constructions are the same as the former embodiments. On the other hand, the rotary universal head type camera is also the same as the rotary universal head type camera 400 in the electric periscope as discussed in the second embodiment.

[Operation]
When the user rotates the casing 110 of the rotary mirror type display apparatus 100B, the angular position information of the casing 110 is fed to the control circuit 208 from the encoder 104 and the origin sensor 105. The control circuit controls the motor 203 on the basis of the angular position information of the rotary mirror type display apparatus 100B and the angle information from the encoder 204 and the origin sensor 205 in the rotary universal head type camera 400.

Figure 23:
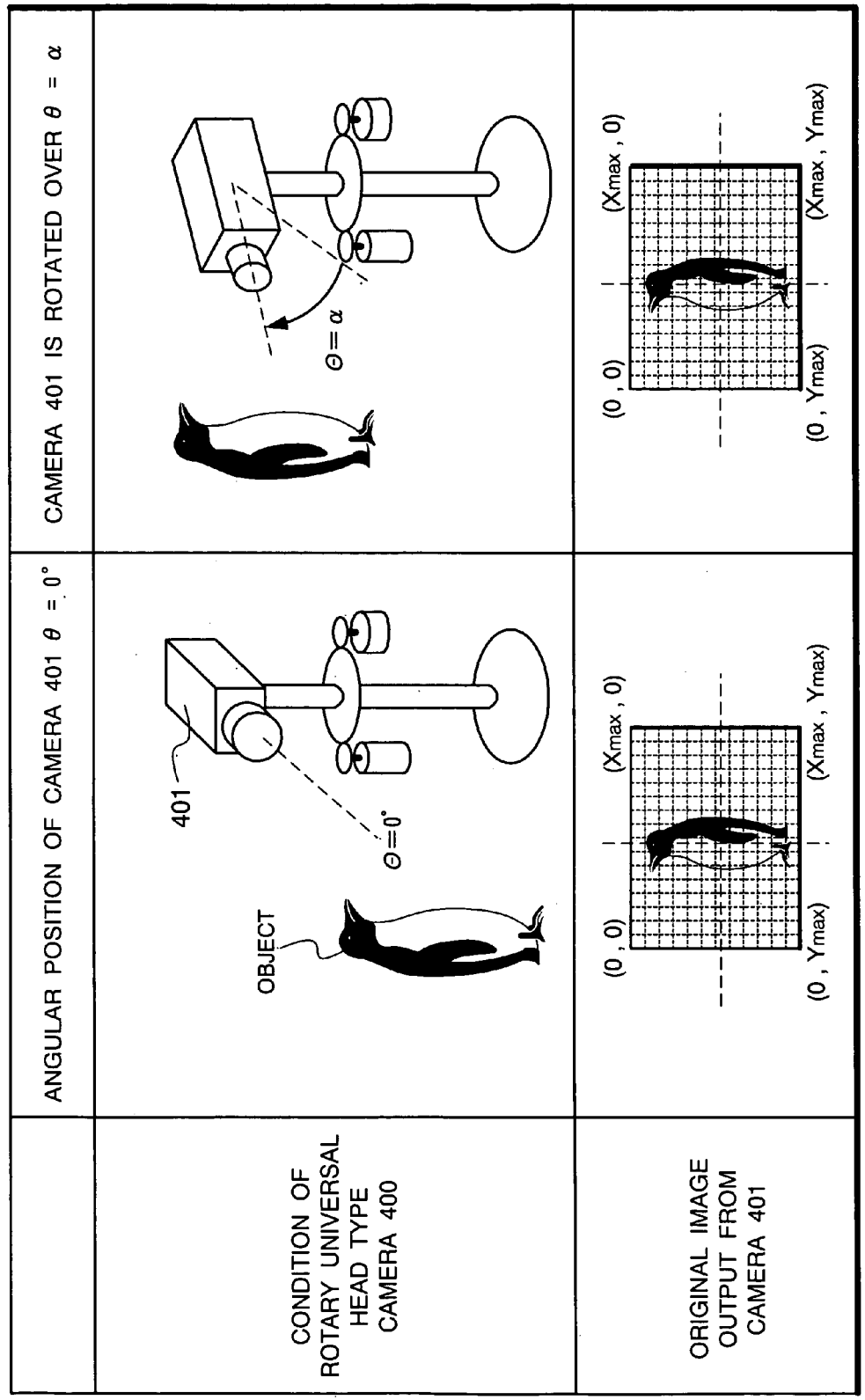
FIG. 23 is an illustration showing a manner of Image formation upon rotation of the fourth embodiment of the camera according to the present invention.

FIG. 23 is an illustration of the rotary universal head type camera 400 and an original image output from the rotary universal head type camera, as a camera 401 is rotated. In the shown embodiment, normal camera (camera 401) picks-up the image of the object by rotating the camera horizontally. Accordingly, irrespective of angular position of the camera 401, up and down direction of the object and up and down direction of the image are matched with each other. Namely, as in the first and third embodiments, up and down direction of the object may not be differentiated from the up and down direction of the image.

[Image Conversion Process in Image Conversion Means 111B]
The image conversion means 111B converts the original image fed from the camera 401 to feed to the monitor 101. The conversion process in the image conversion means 111B will be discussed in terms of the case where the angular position of the camera is θ=α, with reference to FIG. 24.

The original image fed from the camera 401 is at first converted for reversal of up side down with respect to the horizontal axis extending through the center of the image. Next, the original image is rotated in clockwise direction for θ=α about the center of the image for rotational conversion to feed to the monitor 101.

How the image displayed on the monitor 101 be seen by the user across the finder 108 is similar to that seen across the finder 108 in the first embodiment. Discussion has been given with respect to the image viewed on the monitor for FIGS. 7 and 9 and thus further discussion will be omitted.

Fifth Embodiment

Figure 25:
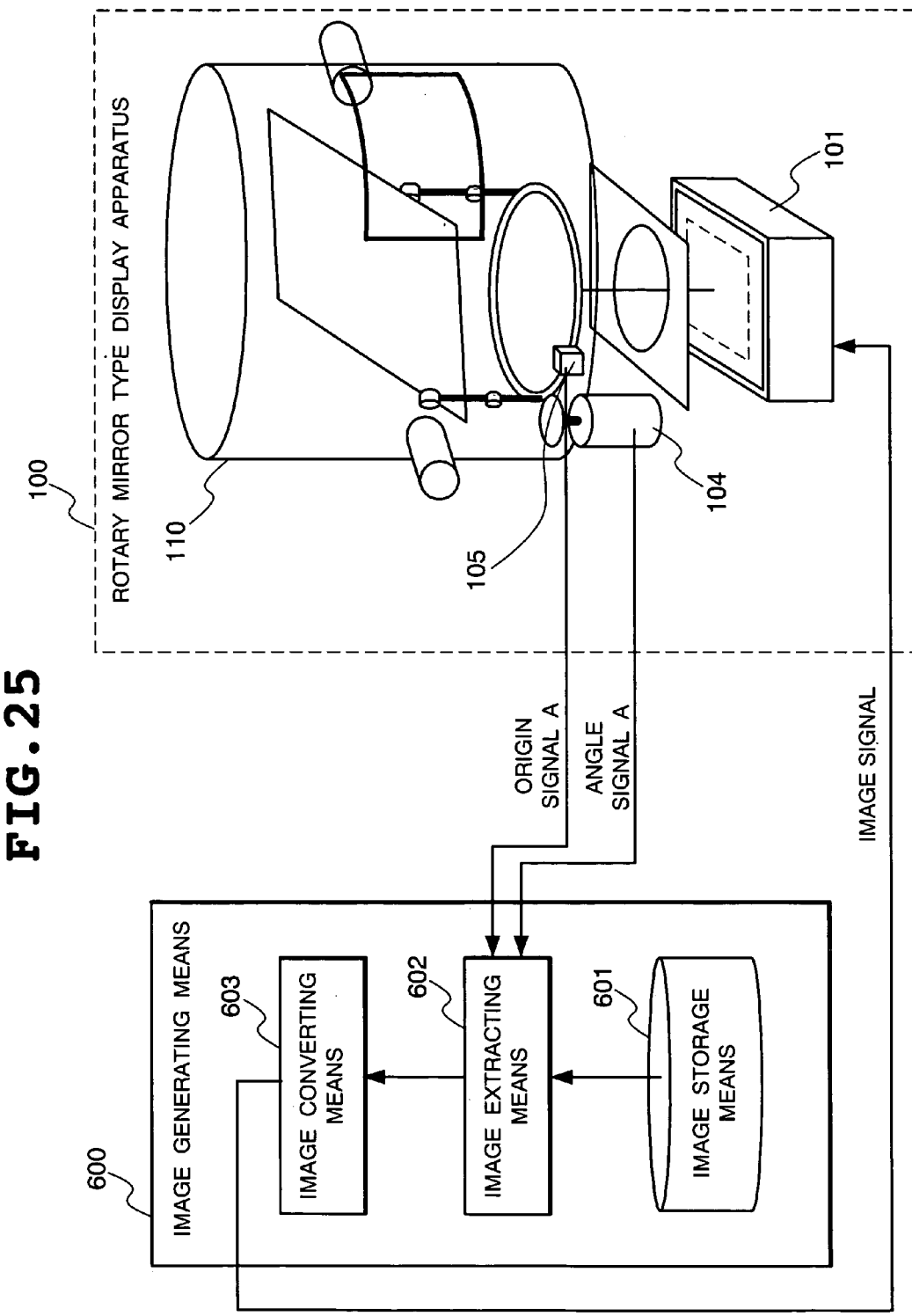
FIG. 25 is a constructional illustration of the fifth embodiment of the camera system according to the present invention.

[Construction]
FIG. 25 is an illustration showing a construction of the fifth embodiment of the camera system according to the present invention.

Referring to FIG. 25, the shown embodiment of the camera system is constructed with the rotary mirror type display apparatus 100 and an image generating means 600. The rotary mirror type display apparatus 100 has the identical construction as the rotary mirror type display apparatus 100 in the first embodiment. Therefore, detailed discussion for those common construction will be omitted in order to avoid redundant disclosure and whereby to keep the disclosure simple enough to facilitate clear understanding of the present invention.

[Operation]
When the user rotates the casing 110, the angular position information of the casing 110 is fed to image extraction means 602 through the encoder 104 and the origin sensor 105. The image extracting means 602 extracts the image to be displayed on the monitor from the overall image stored in image storage means 601 to feed to image conversion means 603. The image conversion means 603 performs conversion process for the image fed from the image extracting means 602 to feed to the monitor 101.

Figure 26:
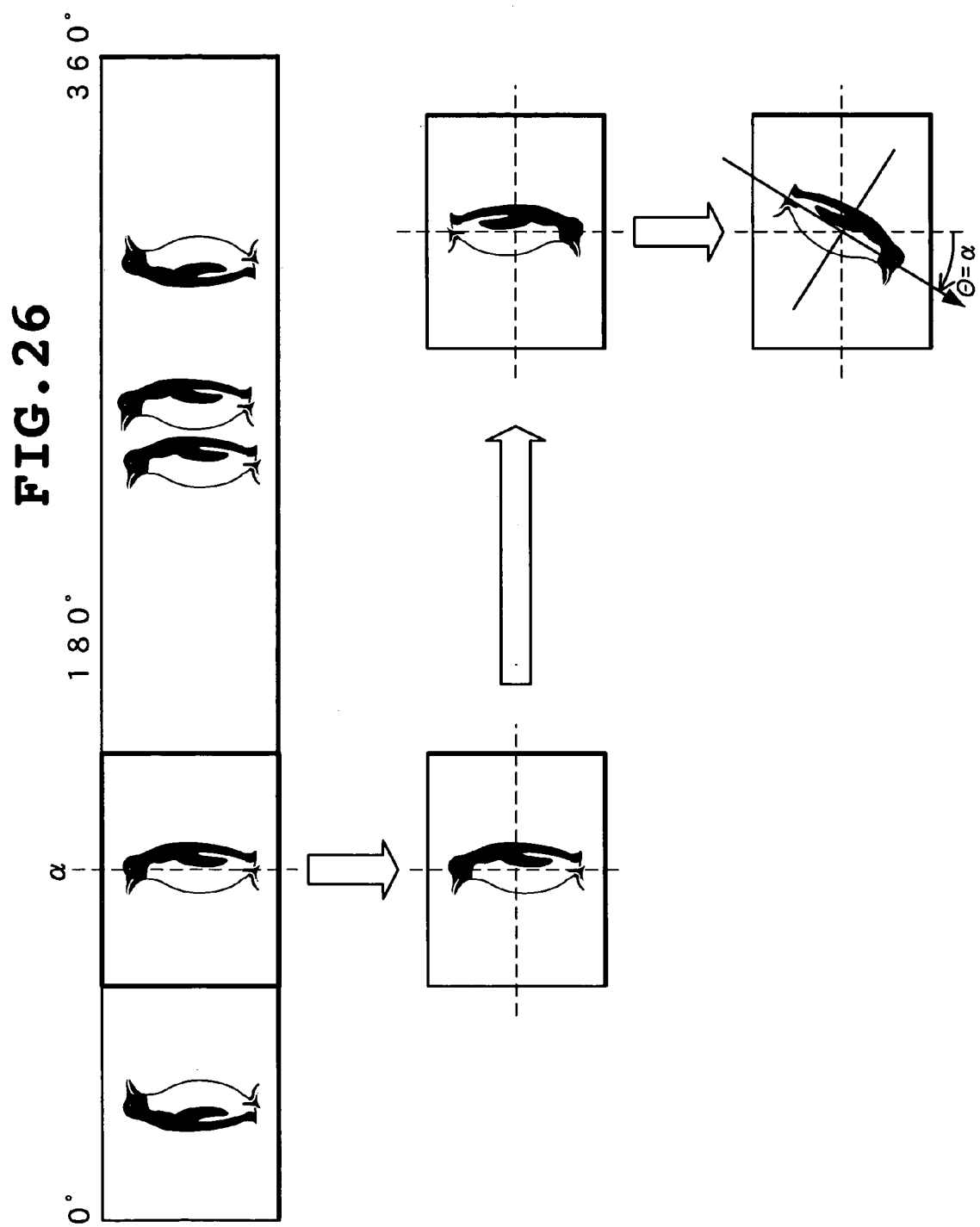
FIG. 26 is an illustration showing manner of an image stored in image storage means, image extraction by image extraction means and image conversion by image conversion means.
Figure 27:
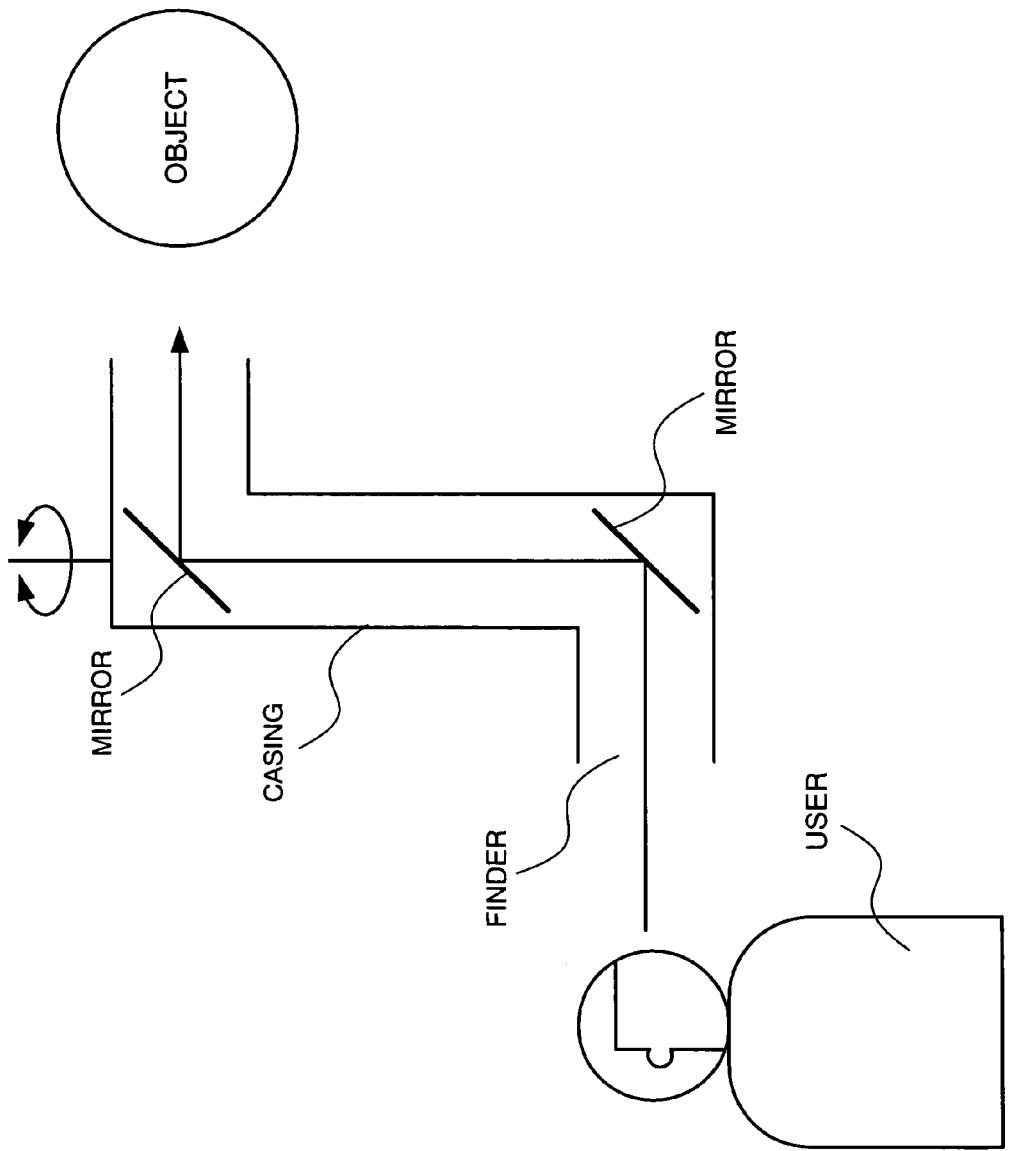
FIG. 27 is an illustration showing a general construction of the conventional optical periscope.
Figure 28:
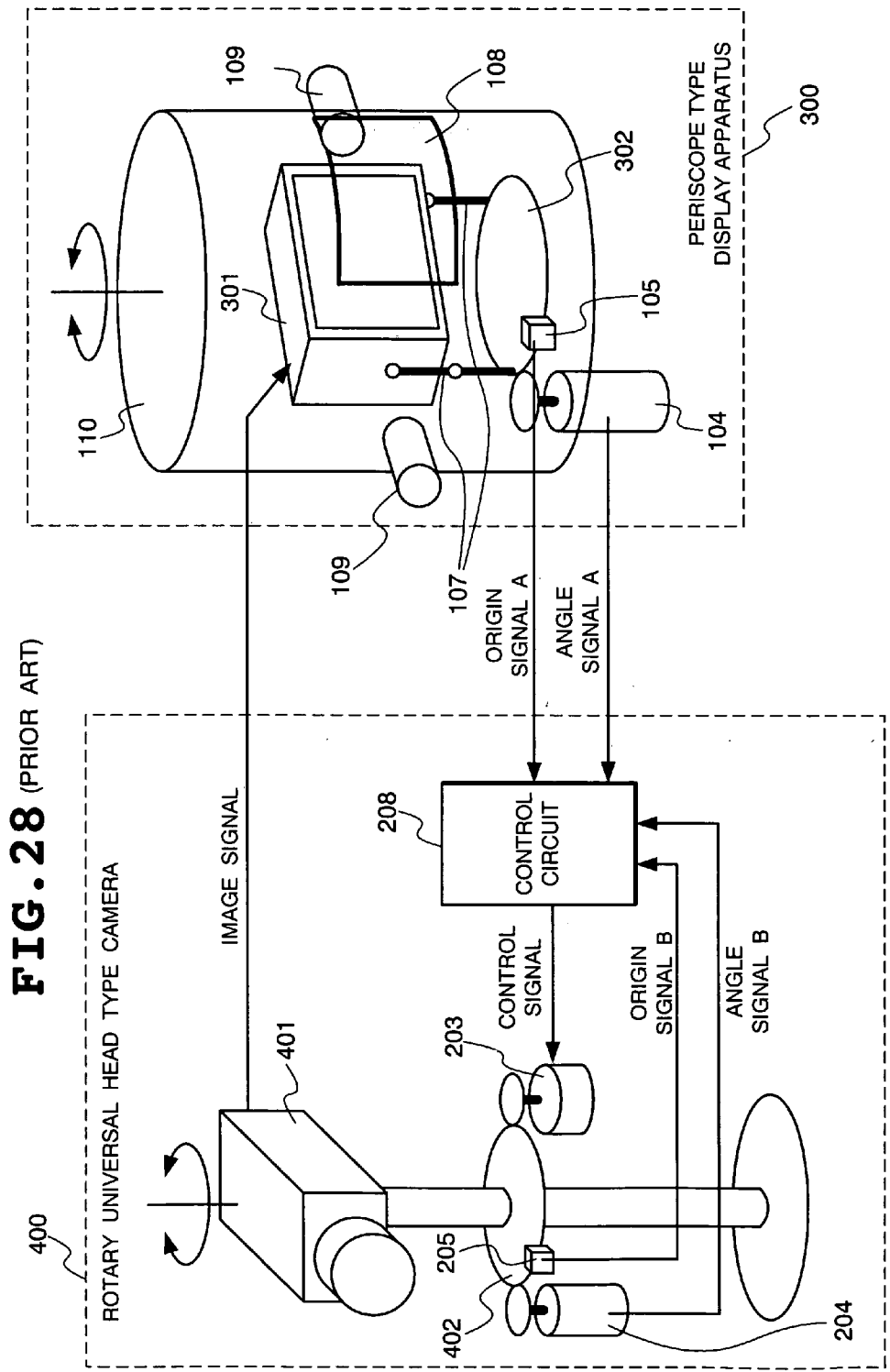
FIG. 28 is an illustration showing a construction of the conventional electronic periscope.
Figure 29:
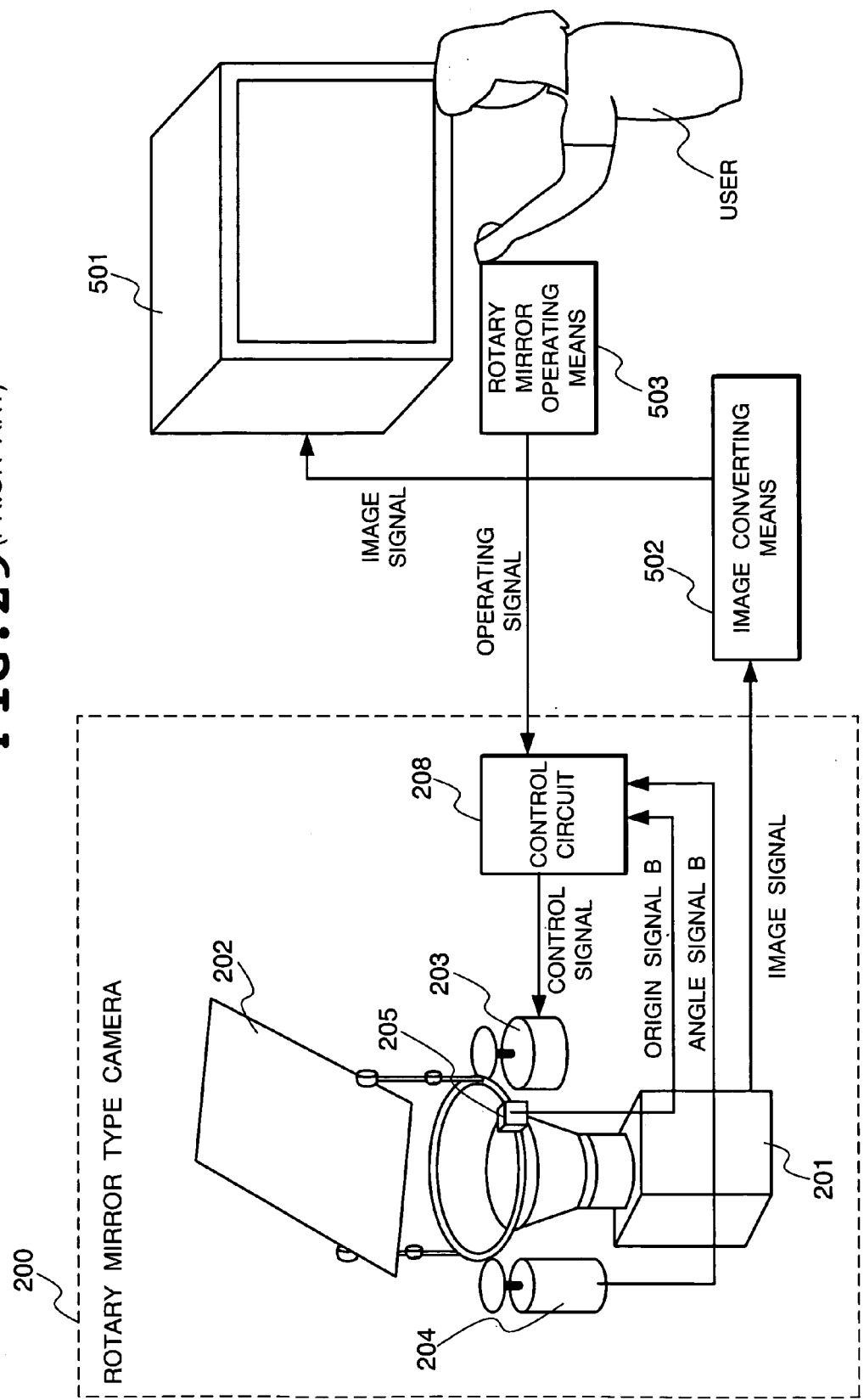
FIG. 29 is an illustration showing a construction of a conventional camera control system, in which a rotary mirror type camera and a normal monitor are combined.
Figure 30:
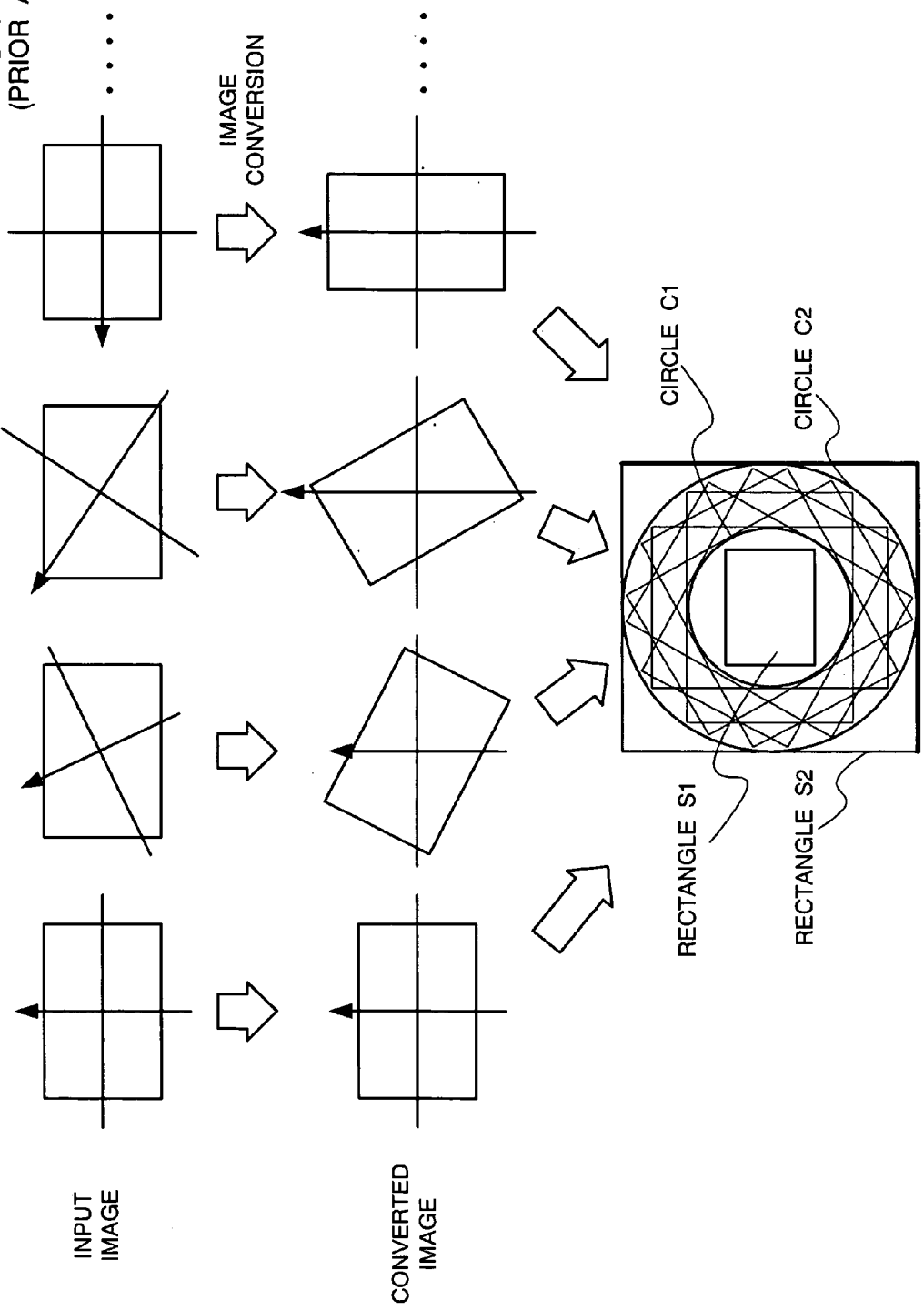
FIG. 30 is an illustration showing a manner of rotation of the image to be obtained by the rotary mirror type camera.
Figure 31:
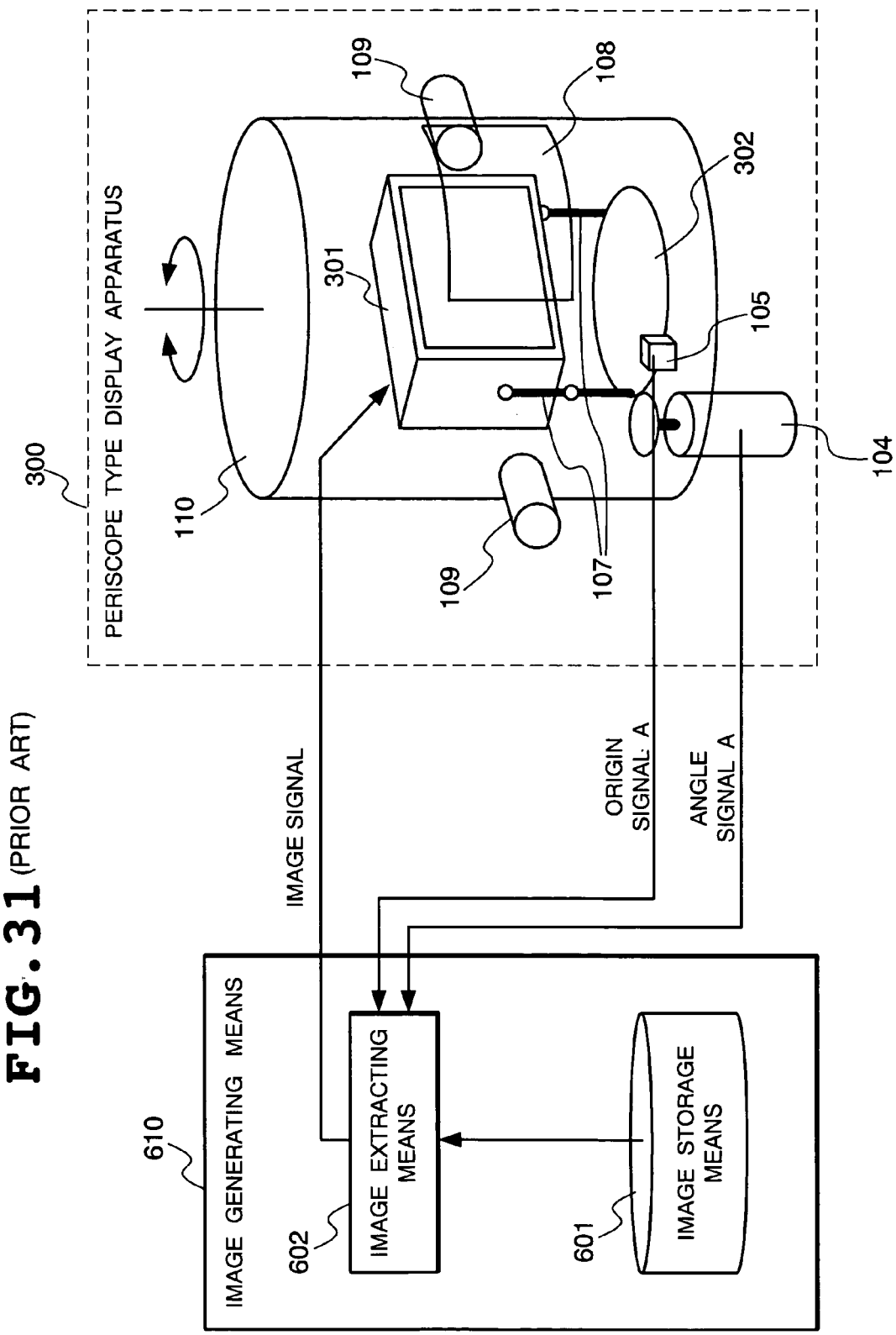
FIG. 31 is an illustration showing a construction of a "rotary type image viewing apparatus" of Japanese Unexamined Patent Publication No. Heisei 9-292827.
Figure 32:
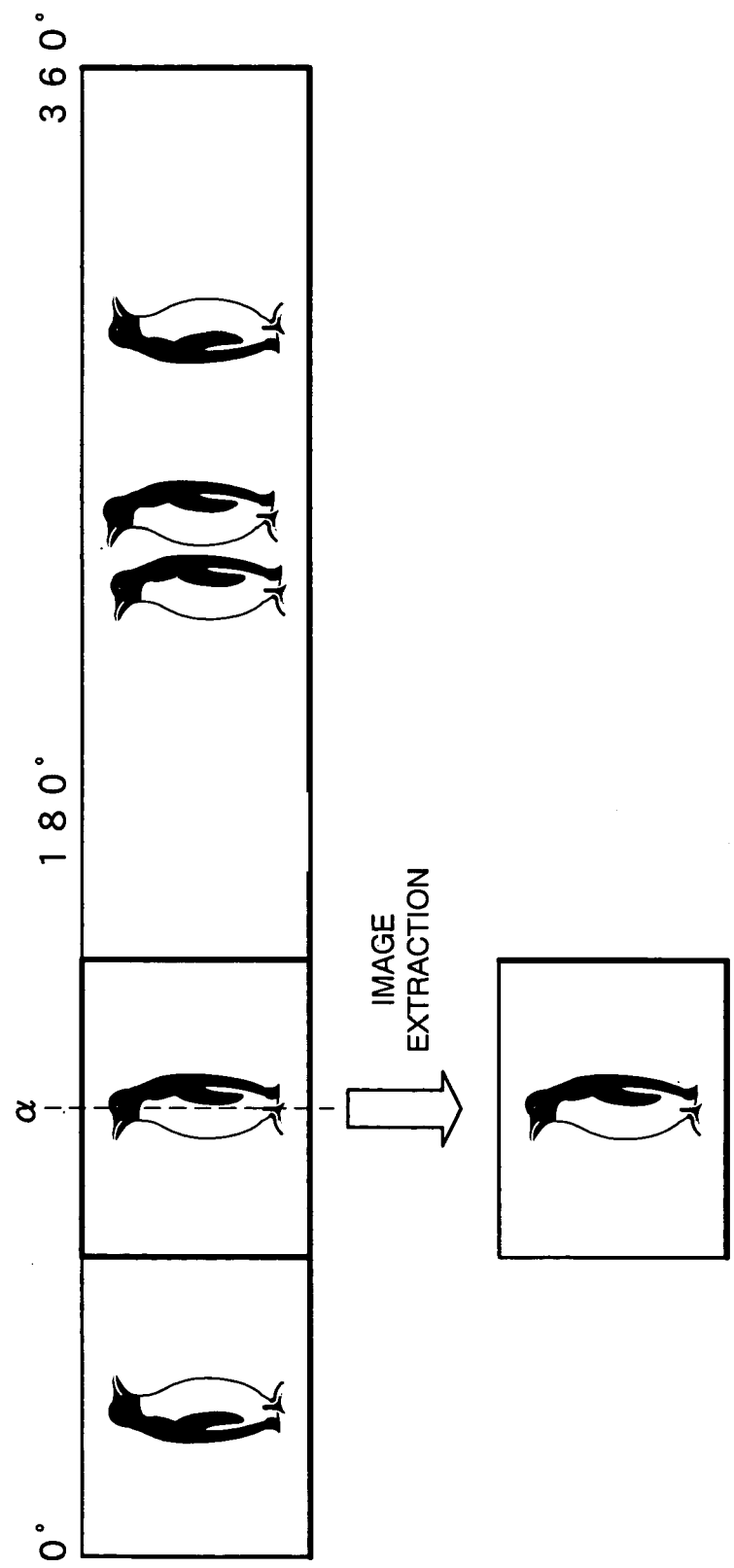
FIG. 32 is an illustration of an image stored in the image storage means in the apparatus shown in FIG. 31 and a manner of image extraction by image extracting means.
Figure 33:
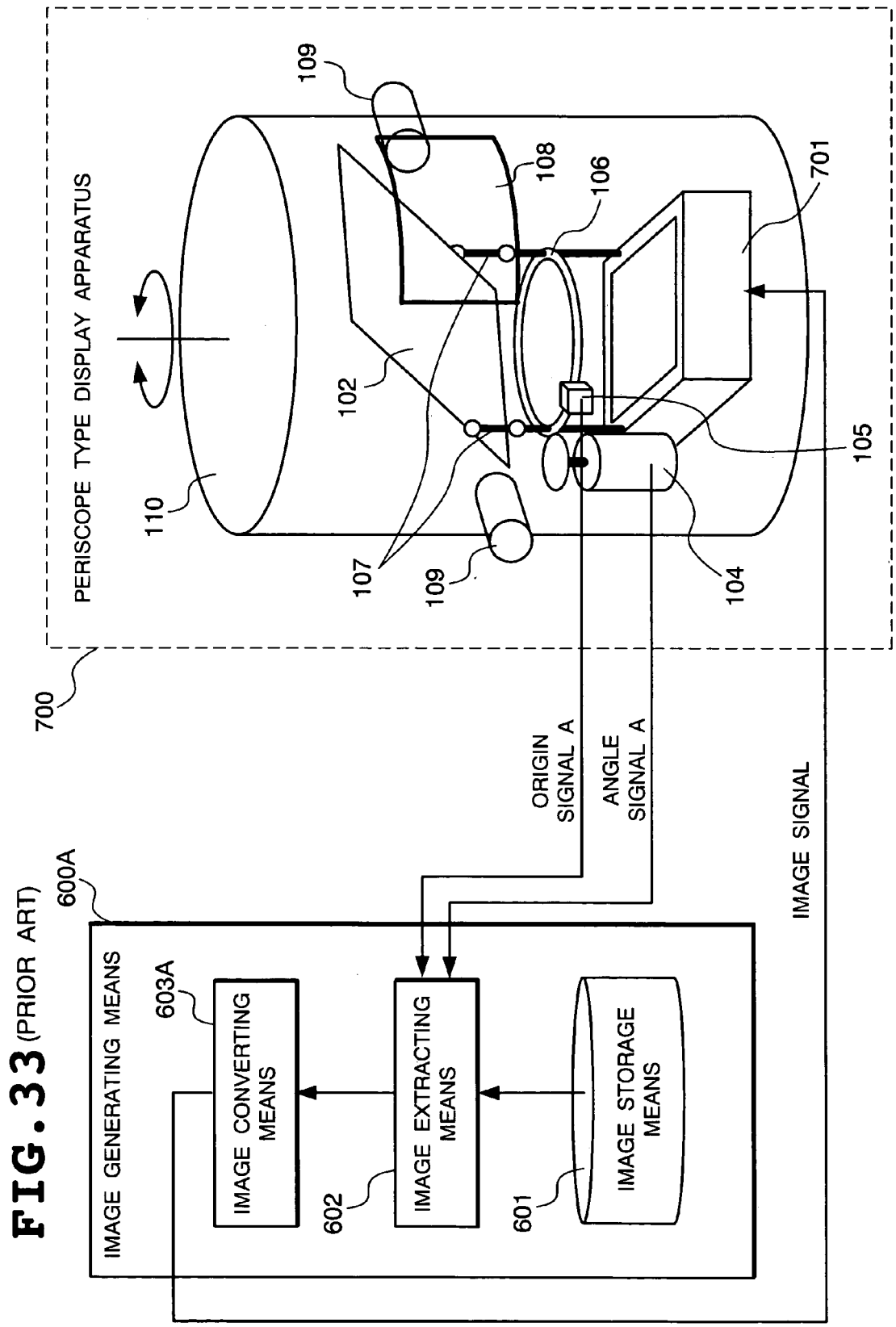
FIG. 33 is an illustration showing a construction of the conventional rotary type image viewing apparatus using the mirror.
Figure 34:
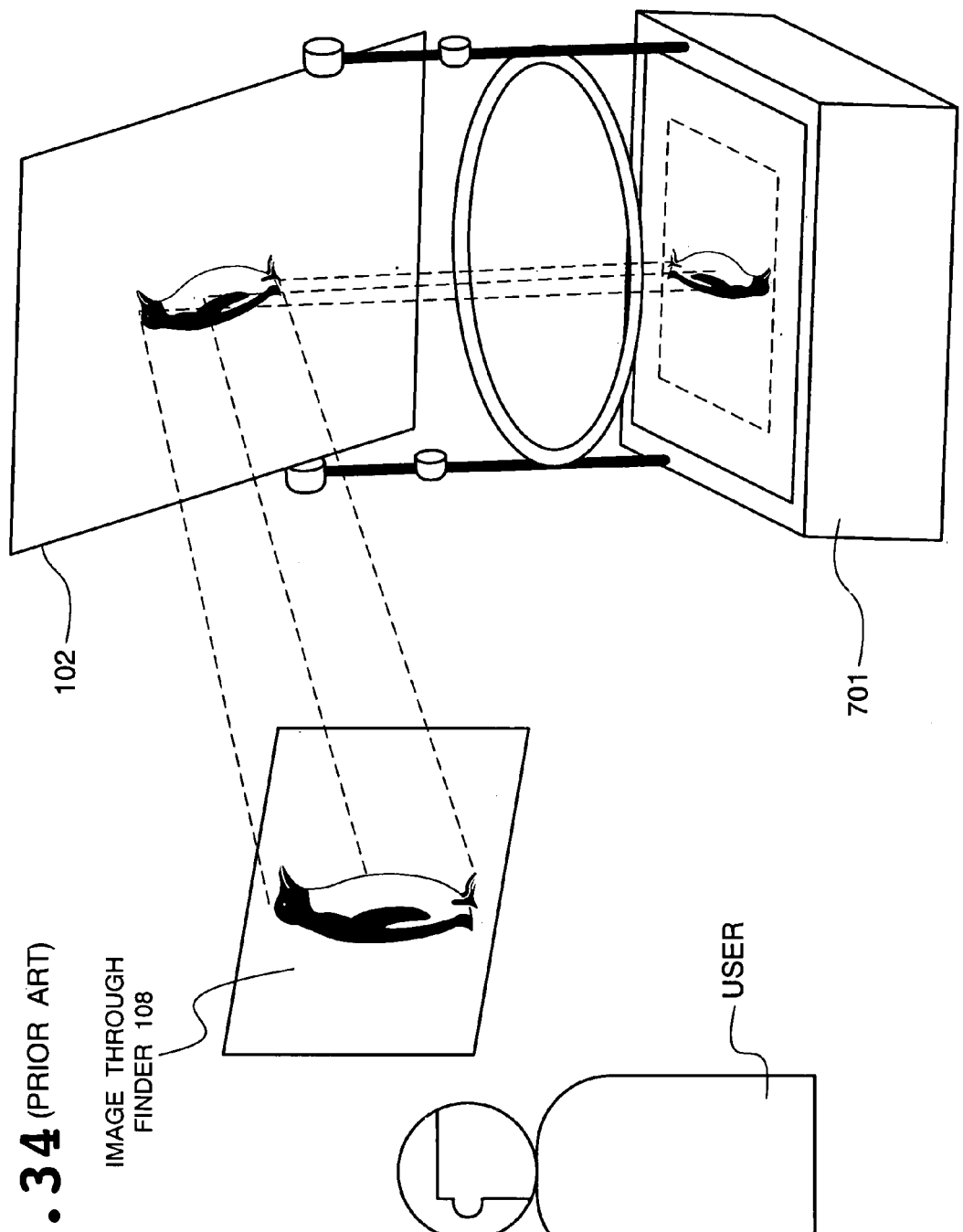
FIG. 34 is an illustration for explaining the reason why conversion of the image up side down manner by the image conversion means in the apparatus shown in FIG. 33.
Figure 35:
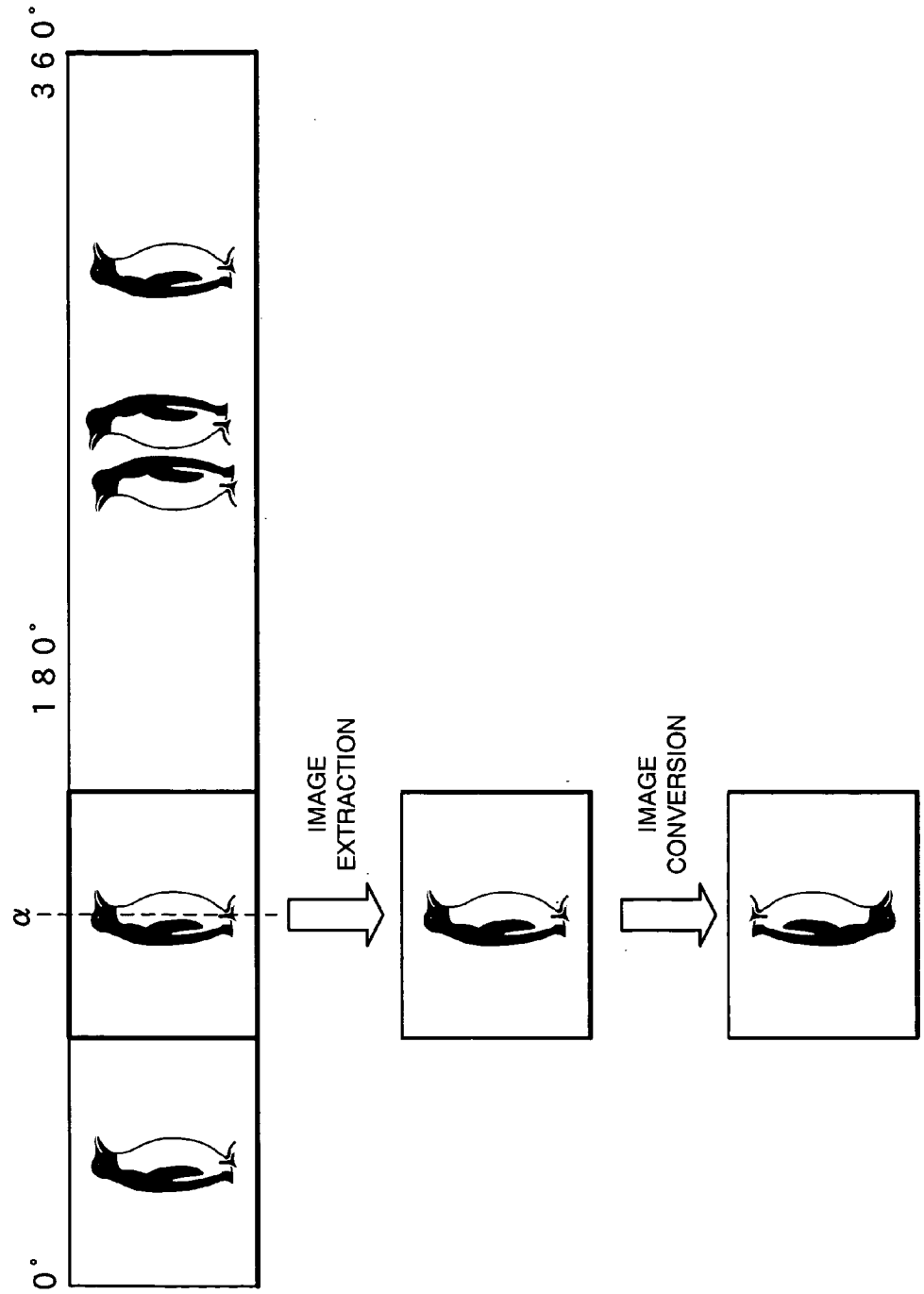
FIG. 35 is an illustration showing the image stored in image storage means, image extraction by the image extracting means and image conversion by the image conversion means, in the apparatus shown in FIG. 33.

[Extraction and Conversion of Image in Image Generating Means 600]
FIG. 26 is an illustration showing a manner of extracting the image to be displayed on the monitor 101 from the overall image stored in image storage means 601 by the image extracting means 602 and image conversion process by the image conversion means 603. As the image to be stored in the image storage means 601, an example of the image of the penguin bleeding space as viewed from inside in the aquarium the same as those illustrated and discussed in FIGS. 32 and 35 as prior art. Lateral direction of panoramic image corresponds to the direction which the user desires to see, namely corresponds to the angular position of the casing 110 and extends over all directions of 0 to 360°. (Upper portion in FIG. 26).

Assuming that the user rotates the casing 110 from the reference position over an angle α, the image extracting means 602 extracts the image of the portion corresponding to the angle α from the entire panoramic image (intermediate portion in FIG. 26). The extracted image is fed to the image converting means 603. Then, at first, the image is converted for reversal in up side down manner in symmetrical fashion with respect to the horizontal axis extending through the center of the image. Thereafter, the image is rotated in clockwise direction over the angle α about the center of the image (lower portion of FIG. 26), and then fed to the monitor 101.

How the image displayed on the monitor 101 be seen by the user across the finder 108 is similar to that seen across the finder 108 in the first embodiment. Discussion has been given with respect to the image viewed on the monitor for FIGS. 7 and 9 and thus further discussion will be omitted.

As set forth above, five embodiments of the present has been discussed. In the shown embodiments, only discussion has been given for variation of the direction to see in horizontal direction (pan), however, in practical apparatus, it should be required to zoom-in and zoom-out and wide screen requiring variation of field angle, or to change image pick-up direction in vertical direction (tilt). However, the present invention is aimed for providing the erected image to the user by canceling image rotation to be caused upon variation of the horizontal direction of the image pick-up direction in the rotary mirror type camera by the rotary mirror type display apparatus and is not relevant to variation of field angle or variation of the image due to variation of the image pick-up direction in vertical direction. Therefore, in the foregoing discussion for the embodiments, discussion has been concentrated for application of the invention for only variation of the image pick-up direction in horizontal direction.

On the other hand, concerning the rotary mirror type display apparatus, discussion has been given as periscope type display apparatus of generally cylindrical shape, in which the image is seen by looking into the finder built-in the monitor, it is also possible to employ a liquid crystal projector in place of the monitor to display the image on the peripheral wall by rotating the mirror for forming the display apparatus.

It should be noted that zoom/wide and tilt operation may also be realized by providing appropriate interface in the casing to be operated by the user. Also, a biaxial mechanism permitting operation of the mirror of the rotary mirror type camera in both of horizontal and vertical directions, has been disclosed in commonly owned Japanese Patent Application No. Heisei 11-180941, "Biaxial Drive Mechanism, Image Input Device using the same and Light Emitting Device". The disclosure of the above-identified commonly owned Japanese Patent Application will be herein incorporated by reference.

With the present invention, since the direction of the object, the absolute angle of the direction, in which the user see the object or the image showing the object, or relative angular variations are matched, visceral recognition of direction becomes possible to facilitate understanding of the overall space where the object is present as original function of the periscope. In addition, the following effects can be achieved.

Remote control of the camera becomes possible.

The camera system according to the present invention is designed for picking up the object by the electronic camera and display device to enable installation in remote site which has not been possible in the optical periscope. As set forth in the discussion for the first embodiment, by installing the rotary mirror type camera in the penguin bleeding space in aquarium, the behavior of penguin as viewed from the inside of the bleeding space can be seen in the site out side can be seen. In contrast to this, if the optical periscope is installed in the penguin bleeding space, a place where the user may enter has to be provided directly above or below the penguin bleeding space.

The rotating portion can be constructed in compact and in light weight.

Furthermore, instead of rotating the monitor and the camera together with both of the rotary mirror type display apparatus and the rotary mirror type camera, the monitor and the camera which are compact and light weight in comparison with the conventional camera are only rotated. Therefore, the rotating portion can be made compact and light weight and thus contribute for down-sizing and reducing of weight. Furthermore in the rotary mirror type camera, in comparison with the case to drive the entire camera, the motor having lower torque becomes applicable. Down-sizing and reduction of weight of the motor becomes possible. On the other hand, in the rotary mirror type display apparatus since the casing to be operated by the user can be made smaller and lighter to improve operability.

It is not necessary to provide electrical connection by the user. Not only reduction of size and weight in the mirror, but also the mirror has not electrical wiring. Accordingly, if it is desired to rotate the casing or mirror of the rotary mirror type camera in endless manner, slip ring or other device for establishing electrical connection between the rotating has to be provided if the whole of the monitor and the camera is rotated. In contrast to this, in accordance with the present invention, since only mirror is rotated, no electrical connection is required.

In the meanwhile, it will provide greater freedom for the user by permitting rotation of the casing or rotary type mirror in endless manner. Also, in comparison with the case where the slip ring is employed, friction of the rotating portion and rotated portion can be reduced for improving reliability of durability.

Image conversion process is unnecessary. By setting the display direction of the monitor in the rotary mirror type display apparatus and the image pick-up direction of the camera in the rotary mirror type camera are set to have angular difference greater than or equal to 90°, namely in reverse direction, the user may see the correctly erected image in up and down direction and left and right direction across the finder even if the image picked up by the camera is output to the monitor without conversion process. Namely, with the present invention, while the rotary mirror type camera causing rotation of the image depending upon the angular position of the mirror with reversing in up side down manner of the object on the picked-up image, necessity of image conversion is eliminated by viewing the image with the rotary mirror type display apparatus.

For performing originally required image conversion process and rotation control of the mirror simultaneously, it is required to employ personal computer or the like. However, in the present invention, it is only required the control circuit (circuit corresponding to the control circuit 208 in the foregoing embodiments) for realizing rotation control for the mirror. Accordingly, high performance CPU as that required in the personal computer is not required to lower cost of the overall apparatus.

What is seen through the finder is not rotating rectangular image but constantly circular image.

By arranging the circular window having circular opening portion between the monitor in the rotary mirror type display apparatus and the mirror for the monitor for providing only image of the region corresponding to the opening portion of the circular window in the image displayed on the monitor through the mirror for the monitor and the finder, the image to be seen across the finder is no uncomfortable rotating rectangular image but is circular image irrespective of the rotational angle of the mirror for the monitor or mirror for the camera.

The image seen across the finder is not rotating rectangular image but constantly non-rotating rectangular image.

By arranging the rectangular window instead of circular window between the monitor and the mirror for the monitor, and fixing the rectangular window on the casing instead of the monitor, the image to be seen across the finder is not the uncomfortable rotating rectangular image but is constantly rectangular image irrespective of the angular position of the mirror of the monitor or the mirror of the camera.

The image to be seen across the finder is not the rotating rectangular image but is constantly circular non-rotating rectangular image.

On the other hand, by arranging the circular window or the rectangular window between the finder and the mirror for the monitor, and fixing the window on the casing, only image of the region corresponding to the opening portion of the circular window or the rectangular window can be provided to the user through the mirror for the monitor and the finder.

By providing the image converting means, display direction of the monitor in the rotary mirror type display apparatus and the image pick-up direction of the camera in the rotary mirror type camera may be set to be less than or equal to 90°.

The camera system may arrange the rotary mirror type camera and the rotary mirror type display apparatus may be arranged so that the image pick-up direction along the light axis of the camera and the display direction of the monitor may be angled within an angular range of less than or equal to 90° by displaying the image picked up by the rotary mirror type camera on the monitor in the rotary mirror type display apparatus with conversion. For example, the image pick-up direction along the light axis of the camera and the display direction of the monitor may be set both in vertically upward direction (angle between both direction is 0°).

The camera system according to the present invention can be installed at arbitrary orientation. It is possible that orientations of the rotary mirror type display apparatus and rotary mirror type camera have to be changed for limitation of the installation side of the camera system of the present invention and limitation in leasing the cable connected to the rotary mirror type display apparatus and the rotary mirror type camera. However, the rotary mirror type display apparatus and the rotary mirror type camera may be arranged in arbitrary orientation.

By using the rotary universal head type camera, the image conversion process can be slightly amplified, and commercial universal head camera may be used.

The present invention is a camera system, in which the universal head type camera and the rotary mirror type display apparatus.

On the other hand, by employing the rotary universal head type camera, the following effect can be achieved. The image to be picked up by the rotary universal head type camera is different from the image picked up by the rotary mirror type camera, in that the image is constantly erected image in which the head and tail of the object and the picked up image match with each other. Therefore, conversion process for displaying the image on the monitor in the rotary mirror type display apparatus can be simplified. Furthermore, the various rotary universal head type camera has been put into market. Therefore, by employing such rotary universal head type camera, may be constructed easily and quickly.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A camera system, in which user operates a camera to watch an image obtained by said camera, comprising:
   a rotary mirror type camera assembly including a camera, a mirror for camera arranged in front of said camera with a given angle relative to a light axis of said camera, and a mirror rotating mechanism driving said mirror for said camera to rotate about said light axis of said camera;
   a rotary mirror type display apparatus including a monitor displaying an image picked up by said camera, a mirror for monitor arranged in front of said monitor with a given angle with respect to a display direction of said monitor, a finder permitting viewing of the image displayed on said monitor via said mirror for monitor, and a casing rotatable together with said mirror for monitor about an axis extending through substantially a center of the display screen of said monitor perpendicular to the display screen;
   said mirror for camera being rotated according to rotation of said casing;
   said mirror for monitor being fixed to said casing, when said casing is rotated, said mirror for monitor being rotated in display direction of said monitor in front of said monitor;
   said monitor being separately disposed from said casing, in which said monitor is fixed in position and does not rotate when said casing rotates.

2. A camera system as set forth in claim 1, wherein said rotary mirror type camera assembly and said rotary mirror type display apparatus are arranged so that an angle between an image pick-up direction along a light axis of said camera and the display direction of said monitor is within a range greater than or equal to 90° and smaller than or equal to 270°.

3. A camera system as set forth in claim 1, wherein a circular window having a circular opening portion and a non-circular blocking portion is arranged external to said casing, between said monitor and said mirror for monitor,
   among an image displayed on said monitor, the image in a region corresponding to said opening portion is provided to a user as an image through said mirror for monitor and said finder,
   said circular window being positioned so as not to rotate with rotation of said casing.

4. A camera system as set forth in claim 1, wherein said rotary mirror type camera assembly and said rotary mirror type display apparatus are arranged so that an angle between an image pick-up direction along a light axis of said camera and the display direction of said monitor is within a range greater than or equal to 90° and smaller than or equal to 270°, a circular window having a circular opening portion and a non-circular blocking portion is arranged external to said casing, between said monitor and said mirror for monitor, among an image displayed on said monitor, the image in a region corresponding to said opening portion is provided to a user as an image through said mirror for monitor and said finder, said circular window being positioned so as not to rotate with rotation of said casing.

5. A camera system as set forth in claim 1, wherein said rotary mirror type camera assembly and said rotary mirror type display apparatus are arranged so that the display direction of the image on said monitor is substantially the same as compared to the display direction of the image as viewed by way of said finder.

\* \* \* \* \*